(12) United States Patent
Lichinchi

(10) Patent No.: US 7,604,134 B2
(45) Date of Patent: *Oct. 20, 2009

(54) PORTABLE KNOCKDOWN TROLLEY HOIST

(76) Inventor: Frank Paul Lichinchi, 17 Lexington Rd., Shirley, NY (US) 11967

( * ) Notice: Subject to any disclaimer, the term of this patent is extended or adjusted under 35 U.S.C. 154(b) by 0 days.

This patent is subject to a terminal disclaimer.

(21) Appl. No.: 12/127,008

(22) Filed: May 26, 2008

(65) Prior Publication Data

US 2008/0223805 A1    Sep. 18, 2008

Related U.S. Application Data

(63) Continuation of application No. 11/623,057, filed on Jan. 12, 2007, now Pat. No. 7,377,398.

(60) Provisional application No. 60/758,801, filed on Jan. 13, 2006.

(51) Int. Cl.
*B66C 5/02* (2006.01)

(52) U.S. Cl. .................... 212/175; 104/126; 212/179; 212/324; 212/343

(58) Field of Classification Search ............ 104/126; 212/175, 224, 317, 324, 179, 343
See application file for complete search history.

(56) References Cited

U.S. PATENT DOCUMENTS

| | | | | |
|---|---|---|---|---|
| 250,312 | A | * | 11/1881 | Walker ............... 212/312 |
| 517,078 | A | * | 3/1894 | True ................... 212/312 |
| 612,413 | A | * | 10/1898 | Guernsey ............ 212/224 |
| 3,159,110 | A | * | 12/1964 | Wylie ................. 104/246 |
| 3,540,603 | A | * | 11/1970 | Neumeier ........... 414/735 |
| 3,713,544 | A | * | 1/1973 | Wallace et al. ..... 212/304 |
| 4,130,168 | A | * | 12/1978 | Deike ................. 173/38 |
| 4,645,084 | A | * | 2/1987 | Deike ................. 212/271 |
| 5,368,124 | A | * | 11/1994 | Fukutomi ........... 182/142 |
| 5,615,785 | A | * | 4/1997 | Kaner ................. 212/180 |
| 7,377,398 | B2 | * | 5/2008 | Lichinchi ........... 212/175 |

* cited by examiner

*Primary Examiner*—Thomas J. Brahan
(74) *Attorney, Agent, or Firm*—Harvey Lunenfeld

(57) ABSTRACT

A portable knockdown trolley hoist, comprising: an overhead trolley support member having a top portion and bottom portion opposing one another; a trolley having a plurality of upper roller bearings and a plurality of lower roller bearings, opposing first mounting plates, an extension boom, and hoist, the plurality of upper and the plurality of lower roller bearings opposing one another and adjacent the top portion and the bottom portion of the overhead trolley support member, respectively, each having shafts transversely mounted to the opposing first mounting plates, opposing raised mounts, each of which have opposing second mounting plates removably fastened one to other and sandwiching the overhead trolley support member therebetween, the trolley rollably mounted to the overhead trolley support member between the opposing raised mounts; opposing substantially upright legs, each of the opposing raised support members having at least two of the opposing substantially upright legs removably fastened thereto.

15 Claims, 29 Drawing Sheets

PORTABLE KNOCKDOWN TROLLEY HOIST

This application is a continuation of U.S. patent application Ser. No. 11/623,057, filed Jan. 12, 2007, now U.S. Pat. No. 7,377,398, which claims the benefit of U.S. Provisional Application No. 60/758,801, filed Jan. 13, 2006, the full disclosures of which all are incorporated herein by reference.

BACKGROUND OF THE INVENTION

1. Field of the Invention

The present invention relates generally to hoists and more particularly to portable knockdown trolley hoists.

2. Background Art

Lifting and moving cargo and various objects by hand is considered to be one of the most significant sources of on the job injury in occupations requiring manual labor and transportation and delivery of cargo from one location to another. Such tasks also become particularly difficult to those not performing such activities routinely and on a day-to-day basis. Cargo and objects typically have to be transported, moved, loaded, and unloaded from one location to another safely, quickly, easily, and efficiently.

A hoist is necessary that overcomes the difficulties presented to those individuals lifting and moving cargo and various objects, and makes such activities easy, safe and secure, whether performed occasionally or on a day-to-day basis. The hoist should be portable, capable of being used in a variety of situations and configurations, in the field, on or off vehicles, or in permanent or semi permanent installations on or off the vehicles. A minimum of training should be required to use, operate, assemble, disassemble, and repair the hoist.

The hoist should have an extension boom, which allows the user to maneuver cargo and other objects at a variety of distances, and be maneuverable substantially collinearly with the extension boom and transverse to the extension boom. The extension boom should preferably be a telescoping extension boom.

The hoist should have a plurality of load bearing surfaces, such as roller bearings, that allow the extension boom to be maneuvered into and out of different locations. Such load bearing surfaces should allow the extension boom to be maneuvered with a minimum of friction of moving parts of the hoist, while maintaining structural integrity of the hoist and maneuverability of the load to be lifted and moved.

The hoist should preferably have a moveable trolley that has a plurality of upper and lower load bearing roller bearings to facilitate moving a variety of different loads with a minimum of friction of moving parts, and optional side roller bearings for further minimizing such friction.

The hoist should be of knockdown construction and capable of being stored and/or transported in knockdown form, allow the user to store the hoist in a small volume, and be capable of being assembled and disassembled quickly, easily, and efficiently, while being of such design and construction to facilitate quick and easy replacement of parts, should such replacement of parts become necessary. Replacement parts should be capable of being used and/or fabricated from standard off-the-shelf hardware.

The hoist should be capable of use on or within and in combination with a large variety and types of vehicles in a variety of configurations, and maneuvering cargo and objects into and out of various locations, while maintaining load balance, and performing with a minimum of friction and imbalance of moving parts of the hoist.

The hoist should allow an individual to move, load, unload, and transport cargo and other objects occasionally and/or routinely in a safe and efficient manner. The hoist should be portable, of knockdown construction, and allow a user to transport the hoist to be used in a large variety of situations and be transported to and from various locations quickly, easily, and conveniently. The hoist should also be capable of being used on a variety of terrains.

The portable knockdown trolley hoist should be capable of being used in combination with a vehicle or different vehicles and in the field on or off the vehicle, and for different applications requiring portability and storage.

The hoist should be of sturdy construction, capable of being assembled, disassembled, and repaired quickly and easily in the field with simple and easily available tools. The hoist should be durable, and long lasting, and allow the user to lift and maneuver a large variety of weights and sizes of cargo and objects.

Different hoists, lifting devices, and the like have heretofore been known. However, none of the hoists, lifting devices, and the like adequately satisfies these aforementioned needs.

- U.S. Pat. No. 7,011,486 (Dyer) discloses a collapsible, portable hoist that can be assembled and operated by a single individual, for lifting and conveying heavy objects onto and off of trucks, especially pickup trucks. When not in use, the hoist collapses down to a flat storage configuration that rests on, and is secured to, the truck's cargo walls, without extending beyond the truck. In order to deploy the hoist, a user rotates its support frame up from the stowed position, and then suspends from it the rail along which a trolley or other implement used to convey the object will travel. When the hoist is fully deployed, the trolley rail is mounted high above the bed, permitting tall objects to be manipulated. The hoist is constructed, so as to be removable from the truck.

- U.S. Pat. No. 5,862,926 (Johnson) discloses a pickup loading hoist for loading and unloading heavy cargo to and from a bed of a pickup, which can be disassembled into a compact storage position. The device includes a front frame and a rear frame vertically aligned parallel to one another and removably attachable to the bed of the pickup, an I-beam secured to the front and rear frames and extending a finite distance beyond the rear frame, a sliding member attached to the I-beam, and a winch for manipulating a chain with a hook.

- U.S. Pat. No. 5,338,147 (Kucharczyk, et al.) a hoist apparatus for cargo compartment, for use in transferring goods into and from a cargo compartment of a vehicle, trailer, container or the like. The hoist apparatus has a first frame having a pair of opposite side members extending in a first horizontal direction, the I-beams each having a vertical web and horizontal upper and lower flanges. The first frame is supported on rollers beneath the roof of the cargo compartment, so as to allow displacement of the first frame in the first horizontal direction between a first, retracted position, in which the first frame is accommodated within the cargo compartment, and a second, extended position, in which the first frame protrudes from the cargo compartment. A second frame or bridge extends horizontally between the opposite side members of the first frame and is supported on rollers on the first frame for movement along the side members. The second frame has a pair of opposite side members extending transversely to the first horizontal direction, and a hoist carriage is mounted on the second frame, for movement along the side members thereof. At least a major portion of the depths of the second frame and of the hoist carriage are located above the underside of the first frame, so as to counteract obstruction of the headroom within the compartment.

U.S. Pat. No. 6,886,811 (Springett, et al.) discloses a portable dynamometer station with a vehicle mounted lifting assembly, which comprises (a) a vehicle, such as a bus, for transporting the dynamometer, (b) a dynamometer with associated monitoring equipment, and (c) a lifting assembly mounted in the vehicle, for transporting the dynamometer from the vehicle to the ground. The lifting assembly includes (i) an upper support beam, (ii) a lower support beam, (iii) a moving trolley on the lower support beam, (iv) a first hydraulic cylinder for moving the lower support beam and the trolley relative to the upper support beam, (v) a second hydraulic cylinder for raising and lowering the dynamometer or other load from the moving trolley, and (vi) a series of pulleys and cables for movement of the lower support beam, the moving trolley, and the dynamometer or other load.

U.S. Pat. No. 4,930,970 (Sunderland) discloses a collapsible hoist for a truck bed, the truck having frame members that are pivotally moveable and slidably connected to one another, such that the apparatus can be assembled and disassembled by a one person, and placed in a transporting position along the edges of the truck bed, thereby occupying a portion of the load carrying space of the truck.

U.S. Pat. No. 3,863,782 (Sandrock) a self-loading article transport vehicle that includes a load carrying bed, a collapsible frame mounted on the vehicle in a substantially upstanding loading disposition above the bed, a load transfer apparatus mounted on the frame, for loading articles onto the bed and for unloading articles therefrom, and wherein the frame is lowerable to a position restraining movement of the articles on the bed.

U.S. Pat. No. 4,187,048 (Bohlmann) discloses a loading and unloading apparatus for a van of a type including a framework within the van for slidably supporting a beam. A winch is moveably disposed on the beam, for allowing an object to be loaded and hoisted upwardly, when the beam and hoist extend outside of the van; and, then the object can be moved into the van by movement of the beam into the van and movement of the winch and object along the beam in the same direction. Once the object is properly positioned within the van, the object can be lowered to the floor of the van for support. Upon reaching the destination for the object, the winch is again used to raise the object off of the floor, whereupon the object is manually pushed out of the van, causing movement of the beam and movement of the winch along the beam. Once the object is outside the van, the object can then be lowered to the ground, by further use of the winch.

U.S. Pat. No. 6,082,561 (Bembas) discloses a portable jib crane for panel trucks or vans, wherein the crane pivots along a common axis between opposing fixed bearing mounts. In practice, one attaches a lifting apparatus to a trolley of the jib. A payload is hoisted off the floor of the vehicle, and after pulling a locking pin, the jib/mast is manually rotated, until the payload is clear of the vehicle. The payload is then lowered to the ground.

U.S. Pat. No. 3,572,513 (Tantlinger, et al.) discloses a trolley crane apparatus, in which a generally rectangular support framework is mounted for movement along a pair of fixed spaced parallel tracks. The framework comprises two interconnected portions each of which is of generally U-shaped configuration and includes a long and a short leg, the long leg of one of the framework portions being detachably connected with the short leg of the other of the framework portions. An elongated trolley support is mounted on the support framework for movement laterally with respect thereto. A trolley means is mounted for movement longitudinally along the trolley support.

U.S. Pat. No. 5,743,702 (Gunderson) discloses a method and apparatus for a hoist system for a vehicle, in which the hoist system includes a support frame mounted to the vehicle. A slidably extendable pair of parallel rails is mounted to the support frame, and the front ends and the tail ends of the parallel rails can be connected. A crossbeam that supports a hoist mechanism is slidably suspended from the pair of rails, and the support frame can be collapsibly hinged for transport. The support frame is mounted to the vehicle at a height above the cab of the vehicle or alternatively incorporated into the ladder rack of the vehicle. The hoist system and can transfer swinging or shifting loads, and has an extended and side-to-side reach.

U.S. Pat. No. 4,239,440 (James) discloses a retractable load lifting and moving apparatus particularly adapted for use on motor vehicles, and for transferring a load into and out of the bed or load receiving space of a pickup truck or other cargo hauling vehicle. The apparatus employs a base structure mountable on the vehicle, a horizontal boom structure carried by the base structure, a winch structure carried by the boom structure adjacent the distal extremity of the latter, and selectively actuatable mechanisms associated with the base structure and respectively coupled with the boom and winch structures, for operating the latter independently to accomplish vertical lifting or lowering and horizontal movement in either direction of a load during emplacement or removal of same relative to the load receiving space along a path having limited clearance as compared with the size of the load.

U.S. Pat. No. 5,429,253 (McNett) discloses a vehicle mounted pivoting hoist, in which a mounted, elevatable, lightweight pivotal boom is provided, which defines an elongate internal track that defines a downwardly facing slot. An electromechanical winch mechanism is provided for lifting and handling objects, such as the windshield of an automotive vehicle, and which includes roller supports having rollers that are received by the internal track of the boom. The winch mechanism includes a DC motor, which is provided with a detachable control circuit to provide for selective operation. The horizontal, pivotal boom is supported by fixed and movable telescoping standards, and may be elevated manually or by means of a jack mechanism, such as a manual or powered operable mechanical, hydraulic or electrical jack.

U.S. Pat. No. 4,249,853 (Lyvers) discloses an apparatus for loading and unloading a vehicle, comprising a supporting frame having a pair of parallel spaced horizontally extending elongated tracks supported near the ends thereof by upstanding legs and elongated cross members operatively secured to the tracks adjacent the upper ends of the legs, thereby defining a loading space within the frame. A hoist carrier is mounted on the tracks for movement longitudinally thereof. The carrier lies substantially within the plane of the tracks near the top of the space. A hoist boom is pivotally mounted on the carrier adjacent one of the tracks, the boom extending horizontally beneath the carrier and being swingable across the space between the tracks. The boom is also movable with the carrier longitudinally of the frame.

U.S. Pat. No. 4,297,071 (Dunbar) discloses a weight transfer apparatus for a weight handling vehicle having a rear cargo compartment with a bed and side walls. A frame adjacent the sidewalls supports a carriage that moves horizontally along the top of the frame and telescopes out the rearward end of the vehicle. A trolley, supporting a hoist for lifting the weight units, moves on the carriage, and when used in tandem with the telescoping carriage, transfers weight units from within the rear cargo compartment to a point exterior of and spaced apart from the rearward end of the cargo compartment.

U.S. Pat. No. 5,028,198 (Buhr) discloses a collapsible full reach truck bed hoist that includes a pair of elongated tracks adapted for securement onto the truck bed in parallel spaced apart relation. An inverted U-shaped hoist frame has opposite depending legs connected to trolley structures, which are supported on the tracks for longitudinal movement therealong. A hoist is supported on the top crossbar of the hoist frame, with freedom of movement along the top crossbar transversely of the truck bed. The hoist frame is collapsible from an upright working position to a lowered transport position, and the tracks, upon which the hoist frame rides, are extendable outwardly of the truck bed, for supporting the hoist frame above an object on the ground adjacent the truck bed.

U.S. Pat. No. 4,068,762 (Kennard, Jr., et al.) discloses a collapsible boom and derrick hoist assembly, including a base frame securable to the side rails of a conventional pickup truck. A collapsible A-frame supports a foldable, two-piece boom assembly. A boom swing mechanism includes a gear driven arrangement, for rotating the boom or yawing the boom about its vertical axis. A boom elevating mechanism including a winch, cable, and a pivotally supported pulley permits elevation of the erected two-piece boom, with the elevation angle remaining constant as the boom swings about its vertical axis. An A-frame erection subassembly including a strut arrangement, for obtaining a mechanical advantage, is provided along with a boom erection and winching cable arrangement. A plurality of screw jacks are pivotally connected to side members of the base frame, and serve to support the derrick hoist assembly and stabilize the assembly during operation.

U.S. Pat. No. 3,072,271 (Costello) discloses a vehicle mounted hoist; U.S. Pat. No. 2,428,144 (Clough) discloses loading means for trucks; and U.S. Pat. No. 2,927,704 (Condon) discloses a hydraulic device for use with transportation vehicles.

U.S. Pat. No. 3,006,486 (Cook, et al.) discloses a material handling system for freight vehicles; U.S. Pat. No. 4,881,864 (Amato) discloses a boom hoist for attachment to a trailer hitch drawbar; and U.S. Pat. No. 5,238,280 (Christensen) discloses a utility rack with enhanced rails.

U.S. Pat. No. 2,773,606 (Shepherd) discloses a tree moving apparatus; U.S. Pat. No. 2,504,232 (Smith) discloses a self-loading apparatus for motor trucks; U.S. Pat. No. 2,289,366 (Johnson) discloses a crane for attachment to motor vehicles; and U.S. Pat. No. 4,334,480 (Wallace) discloses gantries.

U.S. Pat. No. 4,606,430 (Roby, et al.) discloses a rail mounted safety restraint device that is adapted to be mounted on a rail of a railway track, and includes a substantially U-shaped hood, having a pair of hinged hood sections, each supporting upper and lower rollers for engagement respectively with upper and lower surfaces of the ball of the rail. The upper rollers are adjustable, for accommodating different rail weights, the rollers are located wholly within the hood, and the hinged hood sections permit assembly to and removal from the rail.

U.S. Pat. No. 4,221,301 (Walerowski) discloses a crane trolley with a hoist, in which a crane trolley is movable by means of rollers on the lower flange of a runway girder, the crane trolley having a hoist, the latter being inserted in one of the two sides plates of the crane trolley. The load chain of the hoist is guided by means of guide rollers. The chain is fastened with one end to the crane trolley, and is driven by the load chain wheel of the hoist, and carries the lower block with the load hook. The hoist is arranged off-set in the longitudinal direction of the crane trolley relative to the lower block, and the load chain is guided over two additional guide rollers in S-shape between the load chain wheel of the hoist and the pulling chain portion of the lower block.

U.S. Pat. No. 6,149,105 (Jaggard) discloses deployment mechanisms for aircraft auxiliary airfoils, in which a deployment mechanism for moving an aircraft wing leading edge slat or trailing edge flap relative to a main airfoil is provided. The mechanism includes an I-section support beam extending between the main airfoil and the slat or flap. The support beam is driven into and out of the main airfoil by a rack and pinion mechanism, the rack being disposed along a lower boom of the beam, the beam being supported for rolling contact with the main airfoil by upper and lower straddle rollers positioned between wing leading edge ribs. Roller tracks extend along upper and lower booms of the beam, with at least one roller track co-extending with the rack adjacent thereto along the beam.

U.S. Pat. No. 5,738,016 (Scott) discloses a light rail and wheel carriage system that includes first and second rail assemblies held in spaced parallel disposition by a plurality of support members, and cooperating wheel carriage assemblies that mount rail cars onto the rail assemblies. Each rail assembly includes upper and lower elongate tubular rail members, vertically spaced by a vertical flange. In a preferred embodiment, each rail member has a circular configuration, and is bifurcated internally by a received longitudinal edge of the vertical flange. Each wheel carriage assembly includes a carriage frame, first and second elongate pivot shafts, a set of upper and lower rollers, and a compressible strut. In a preferred embodiment, a set of upper and lower rollers is pivotally secured to opposite ends of the first pivot shaft. A second set of upper and lower rollers is also pivotally secured to opposite ends of the second pivot shaft. The compressible strut interconnects the upper roller of the first pivot shaft to the lower roller of the second pivot shaft.

U.S. Pat. No. 4,208,970 (Matyas) discloses movable lading bracing stanchions for freight cars, which includes a movable stanchion for bracing freight in a transportation vehicle, such as a railroad car or the like. The stanchion is supported for movement along the length of the cargo area of the car by an overhead track. A locking device carried by the stanchion cooperates with the overhead track and a floor mounted track to lock the stanchion in preselected bracing positions. The stanchion has a bracing face that extends transversely to its direction of movement, and which is substantially less in the transverse direction than one-half of the width of the cargo area. The stanchion also has a device, which cooperates with the floor mounted track, so as to prevent pivotal movement in a transverse direction.

U.S. Pat. No. 4,767,091 (Cuny) discloses an antifall safety device that includes a safety device for mounting on a beam section, including a body, comprising two articulated portions having projections, which produce a wedging effect on the beam section, when under the pull of a load.

U.S. Pat. No. 3,998,346 (Gibson, et al.) discloses material handling apparatus, in which the fork carriage of a sideloader truck is journalled for rotation about a vertical axis between two arms, one above and one below the carriage, which transmit lateral load moments to a narrow vertical member. A vertically-extending torque shaft journalled on the vertical member carries gears on its opposite ends. The gears engage laterally-extending racks spaced widely vertically apart on a rearward carriage, so that lateral load moments apply minimum forces to the racks, and rotation of the torque shaft also serves to laterally position the vertical member and the fork carriage. The rearward carriage may comprise an elevatable, mast-guided laterally-fixed carriage, or an intermediate carriage may be interposed between the vertical member and the laterally-fixed carriage to provide greater lateral load extension. An intermediate carriage, having a roller arrangement insuring adequate support at any lateral load position, is shown. By mounting the truck load wheels on the ends of an axle member, a given truck design can be adapted for use in aisles of different widths, without changes to a heavy welded base frame of the truck.

For the foregoing reasons, there is a need for a hoist that overcomes the difficulties presented to those individuals lifting and moving cargo and various objects, and makes such activities easy, safe and secure, whether performed occasionally or on a day to day basis. The hoist should be portable, capable of being used in a variety of situations and configurations, in the field, on or off vehicles, or in permanent or semi permanent installations on or off the vehicles. A minimum of training should be required to use, operate, assemble, disassemble, and repair the hoist.

The hoist should have an extension boom, which allows the user to maneuver cargo and other objects at a variety of distances, and be maneuverable substantially collinearly with the extension boom and transverse to the extension boom. The extension boom should preferably be a telescoping extension boom.

The hoist should have a plurality of load bearing surfaces, such as roller bearings, that allow the extension boom to be maneuvered into and out of different locations. Such load bearing surfaces should allow the extension boom to be maneuvered with a minimum of friction of moving parts of the hoist, while maintaining structural integrity of the hoist and maneuverability of the load to be lifted and moved.

The hoist should preferably have a moveable trolley that has a plurality of upper and lower load bearing roller bearings to facilitate moving a variety of different loads with a minimum of friction of moving parts, and optional side roller bearings for further minimizing such friction.

The hoist should be of knockdown construction and capable of being stored and/or transported in knockdown form, allow the user to store the hoist in a small volume, and be capable of being assembled and disassembled quickly, easily, and efficiently, while being of such design and construction to facilitate quick and easy replacement of parts, should such replacement of parts become necessary. Replacement parts should be capable of being used and/or fabricated from standard off-the-shelf hardware.

The hoist should be capable of use on or within and in combination with a large variety and types of vehicles in a variety of configurations, and maneuvering cargo and objects into and out of various locations, while maintaining load balance, and performing with a minimum of friction and imbalance of moving parts of the hoist.

The hoist should allow an individual to move, load, unload, and transport cargo and other objects occasionally and/or routinely in a safe and efficient manner. The hoist should be portable, of knockdown construction, and allow a user to transport the hoist to be used in a large variety of situations and be transported to and from various locations quickly, easily, and conveniently. The hoist should also be capable of being used on a variety of terrains.

The portable knockdown trolley hoist should be capable of being used in combination with a vehicle or different vehicles and in the field on or off the vehicle, and for different applications requiring portability and storage.

The hoist should be of sturdy construction, capable of being assembled, disassembled, and repaired quickly and easily in the field with simple and easily available tools. The hoist should be durable, and long lasting, and allow the user to lift and maneuver a large variety of weights and sizes of cargo and objects.

SUMMARY

The present invention is directed to a portable knockdown trolley hoist that overcomes the difficulties presented to those individuals lifting and moving cargo and various objects, and makes such activities easy, safe and secure, whether performed occasionally or on a day to day basis. The portable knockdown trolley hoist is portable, capable of being used in a variety of situations and configurations, in the field, on or off vehicles, or in permanent or semi permanent installations on or off the vehicles. A minimum of training is required to use, operate, assemble, disassemble, and repair the portable knockdown trolley hoist.

The portable knockdown trolley hoist has an extension boom, which allows the user to maneuver cargo and other objects at a variety of distances, and is maneuverable substantially collinearly with the extension boom and transverse to the extension boom. The extension boom is preferably a telescoping extension boom.

The portable knockdown trolley hoist has a plurality of load bearing surfaces, such as roller bearings, that allow the extension boom to be maneuvered into and out of different locations. Such load bearing surfaces allow the extension boom to be maneuvered with a minimum of friction of moving parts of the portable knockdown trolley hoist, while maintaining structural integrity of the portable knockdown trolley hoist and maneuverability of the load to be lifted and moved.

The portable knockdown trolley hoist has a moveable trolley that has a plurality of upper and lower load bearing roller bearings to facilitate moving a variety of different loads with a minimum of friction of moving parts, and optional side roller bearings for further minimizing such friction.

The portable knockdown trolley hoist is of knockdown construction and is capable of being stored and/or transported in knockdown form, allows the user to store the portable knockdown trolley hoist in a small volume, and is capable of being assembled and disassembled quickly, easily, and efficiently, while being of such design and construction to facilitate quick and easy replacement of parts, should such replacement of parts become necessary. Replacement parts are capable of being used and/or fabricated from standard off-the-shelf hardware.

The portable knockdown trolley hoist is capable of being used on or within and in combination with a large variety and types of vehicles in a variety of configurations, and maneuvering cargo and objects into and out of various locations, while maintaining load balance, and performing with a minimum of friction and imbalance of moving parts of the portable knockdown trolley hoist.

The portable knockdown trolley hoist allows an individual to move, load, unload, and transport cargo and other objects occasionally and/or routinely in a safe and efficient manner. The portable knockdown trolley hoist is portable, of knockdown construction, and allows a user to transport the portable knockdown trolley hoist to be used in a large variety of situations and to be transported to and from various locations quickly, easily, and conveniently. The portable knockdown trolley hoist is also capable of being used on a variety of terrains.

The portable knockdown trolley portable knockdown trolley hoist is capable of being used in combination with a vehicle or different vehicles and in the field on or off the vehicle, and for different applications requiring portability and storage.

The portable knockdown trolley hoist is of sturdy construction, capable of being assembled, disassembled, and repaired quickly and easily in the field with simple and easily available tools. The portable knockdown trolley hoist is durable, and long lasting, and allows the user to lift and maneuver a large variety of weights and sizes of cargo and objects.

A portable knockdown trolley hoist having features of the present invention comprises: a trolley support member having opposing ends; a trolley having a plurality of upper roller bearings and a plurality of lower roller bearings, the trolley rollably sandwiching an upper portion and a lower portion of the trolley support member between the plurality of upper roller bearings and the plurality of lower roller bearings, the trolley having a telescoping extension boom fastened thereto and extending from the trolley, the telescoping extension boom having a plurality of extension boom sections, the extension boom having a sheave mounted thereto, the trolley having a hoist having a winch and a hoist cable, the hoist cable extending from the winch and about the sheave and having a lifting end; opposing end supports, each of the opposing end supports having an opposing support member and opposing substantially upright legs removably fastened to the opposing support member; opposing end mounts, each opposing end mount releasably sandwiching an opposing end of the trolley support member and an opposing support member therebetween.

DRAWINGS

These and other features, aspects, and advantages of the present invention will become better understood with regard to the following description, appended claims, and accompanying drawings where:

DESCRIPTION

Figure 1:
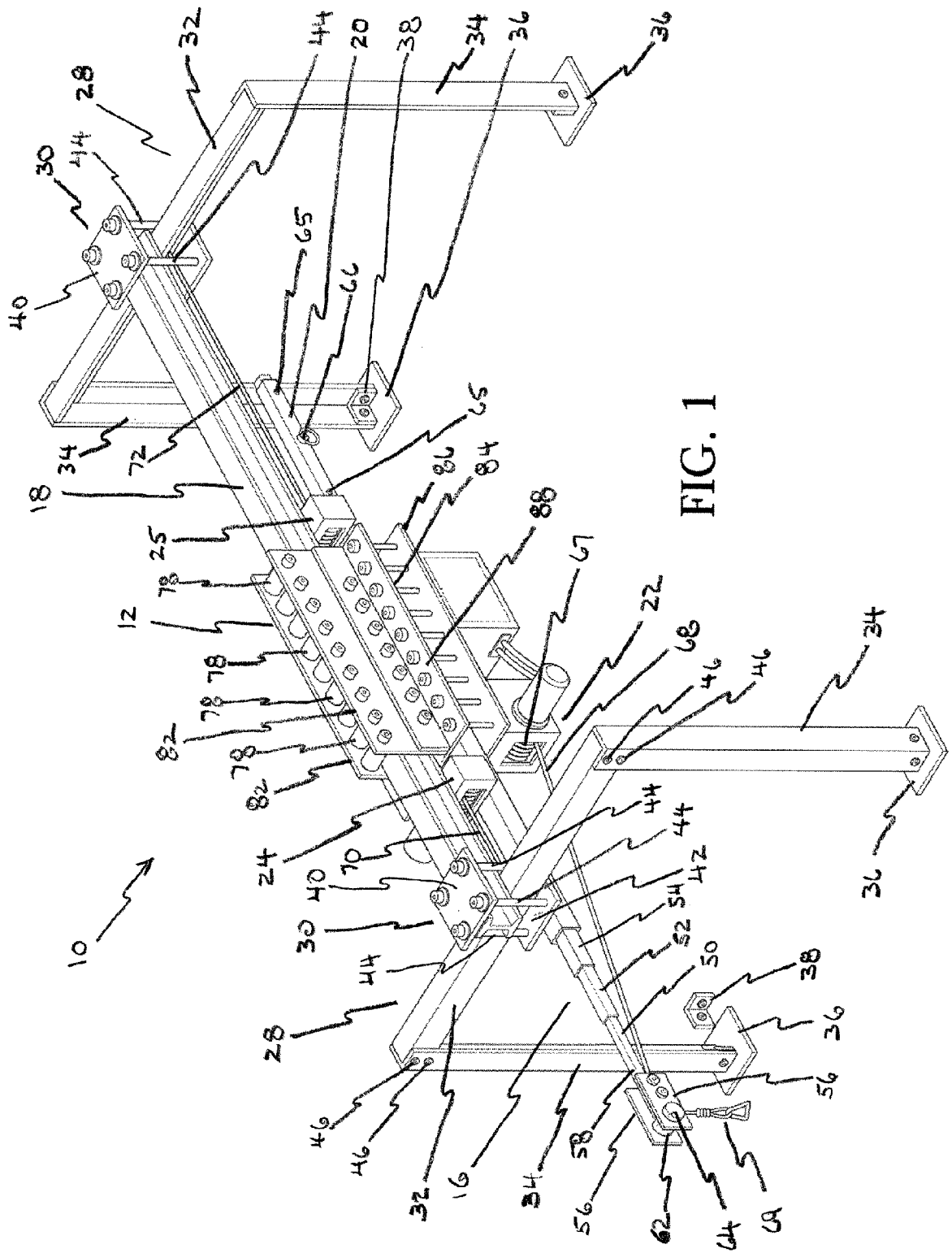
FIG. 1 is a perspective view of a portable knockdown trolley hoist, constructed in accordance with the present invention, showing an extension boom of the portable knockdown trolley hoist partially extended.
Figure 2:
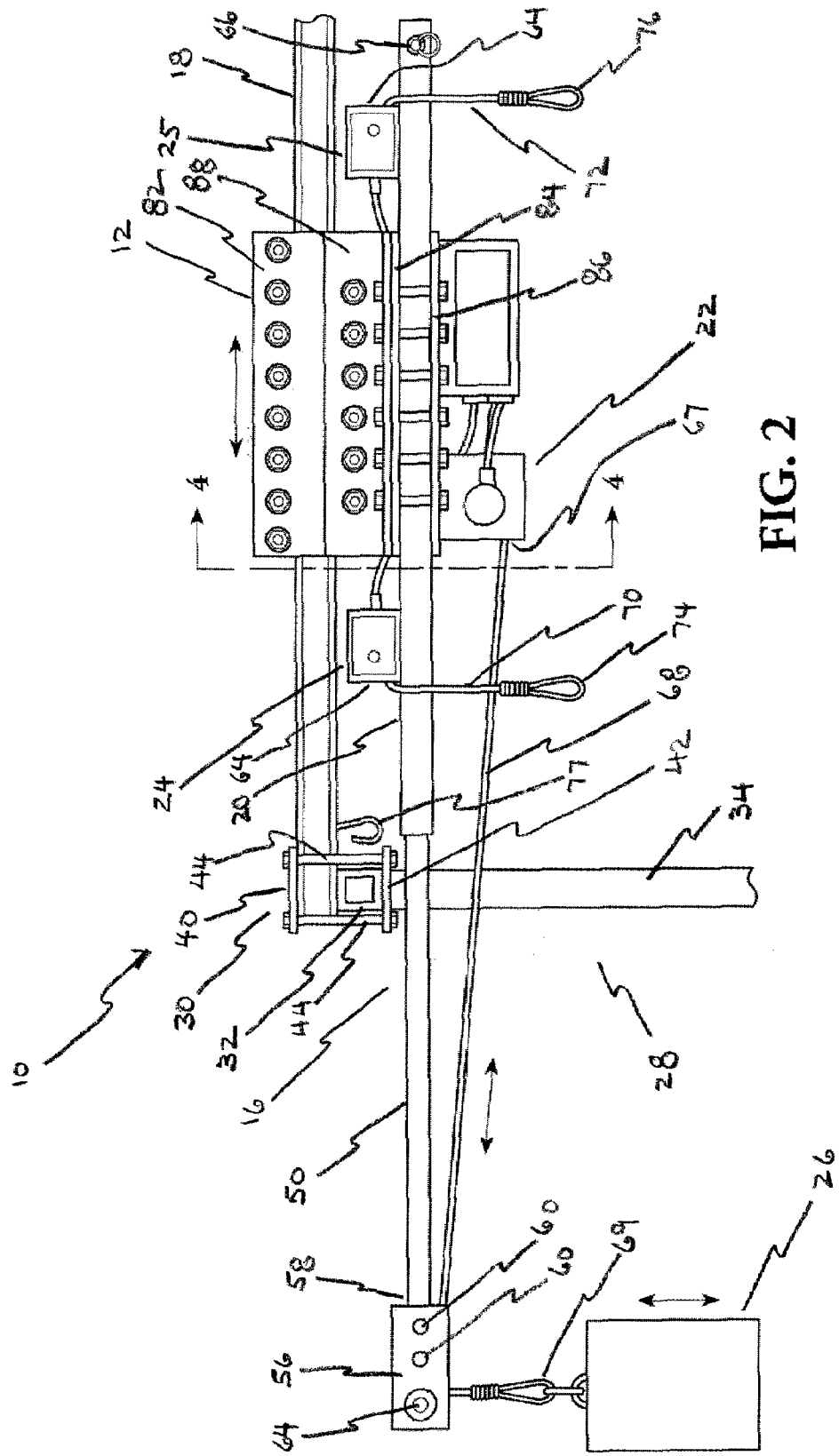
FIG. 2 is a partial side view of the portable knockdown trolley hoist of FIG. 1.
Figure 3:
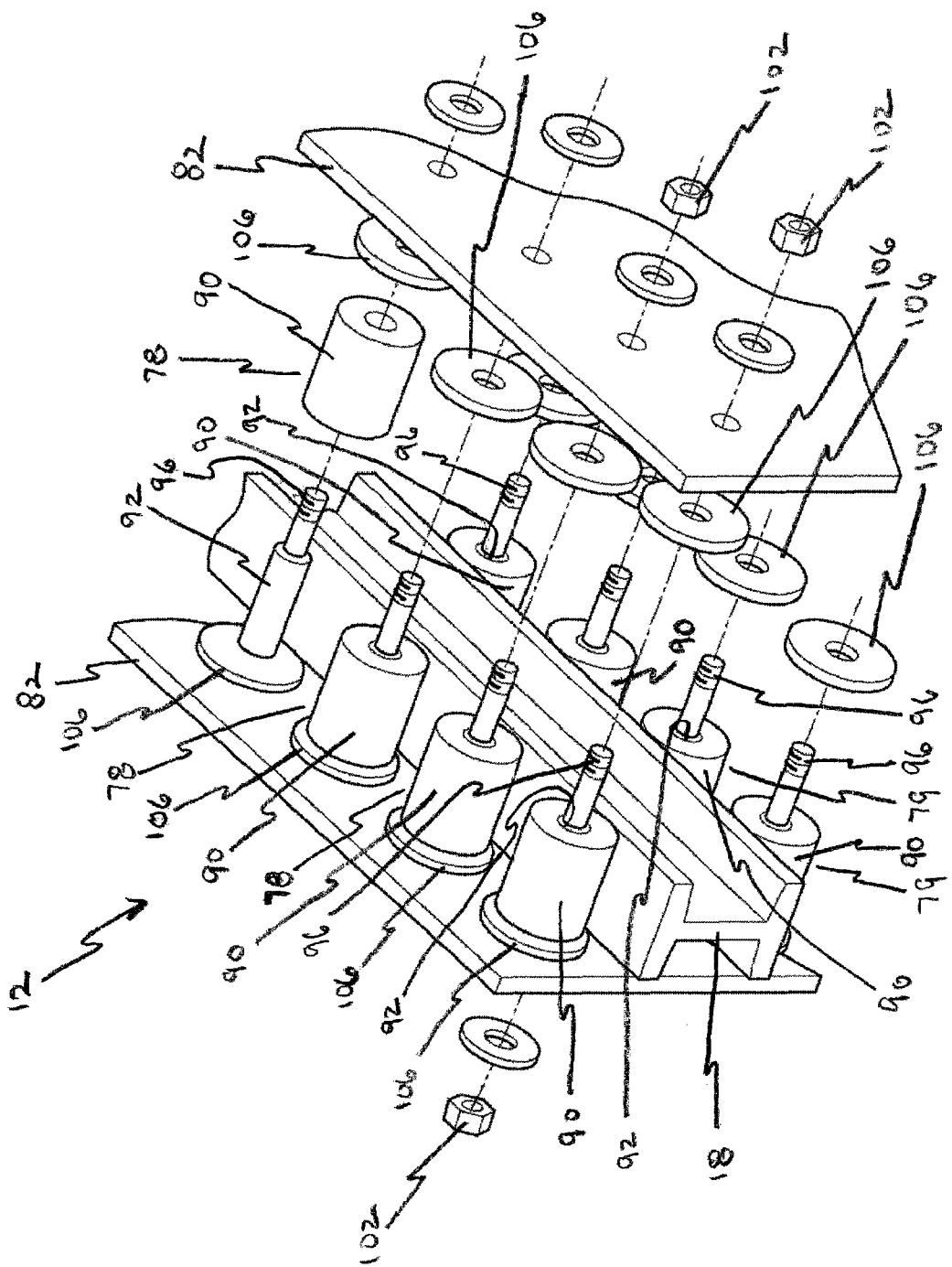
FIG. 3 is a partial exploded view of a trolley and a trolley support member of the portable knockdown trolley hoist of FIG. 1.
Figure 4:
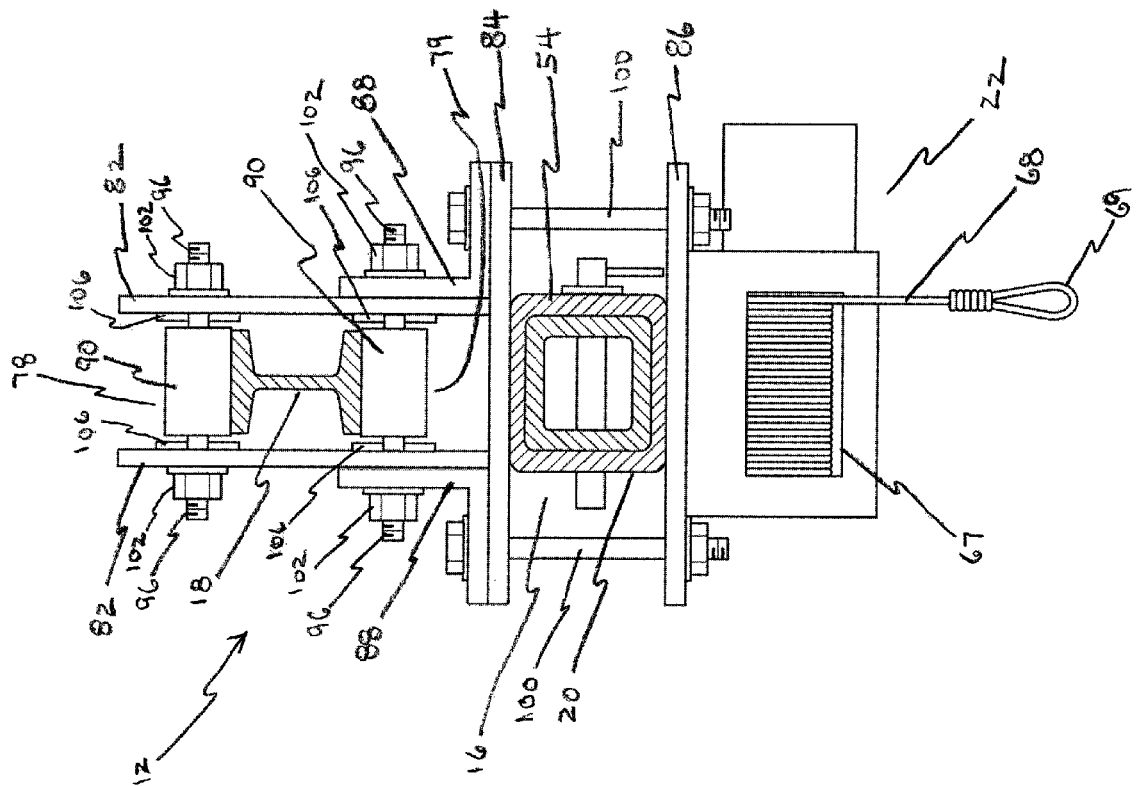
FIG. 4 is a cross section view of the portable knockdown trolley hoist of FIG. 1 showing the trolley of FIG. 1.

The preferred embodiments of the present invention will be described with reference to FIGS. 1-29 of the drawings. Identical elements in the various figures are identified with the same reference numbers.

FIGS. 1-4 show an embodiment of the present invention, a portable knockdown trolley hoist 10 having a trolley 12, telescoping extension boom 16, and trolley support member 18. The trolley 12 is rollably mounted to the trolley support member 18, and the telescoping extension boom 16 has sleeve 20, which is mounted to and supported by the trolley 12. The portable knockdown trolley hoist 10 has hoist 22 and opposing trolley positioners 24 and 25, the hoist 22 being used to releasably lift and maneuver a desired weight 26 or other suitable object, and the opposing trolley positioners 24 and 25 being used to position the trolley 12 to a desired location along the trolley support member 18.

The portable knockdown trolley hoist 10 has opposing end supports 28 and opposing end mounts 30. Each of the opposing end supports 28 has opposing end support member 32 and opposing substantially upright legs 34, each of the opposing end supports 28 constructed to have an inverted substantially U shape, with the opposing end support member 32 being the upper most portion thereof. The trolley support member 18 is transverse to the opposing end support members 32, and is mounted to the opposing end support members 32 with the opposing end mounts 30. The opposing end supports 28 also have base plates 36, which have upright angle connector portions 38, and which are adapted to be fastened to the opposing substantially upright legs 34. The opposing end mounts 30 releasably fasten the trolley support member 18 to the opposing support members 32, and allow the trolley support member 18 to be moved transverse to the opposing support members 32.

The opposing end mounts 30 have upper plates 40, lower plates 42, and releasable fasteners 44, which releasably fasten and releasably clamp the trolley support member 18 to the opposing support members 32, and sandwich opposing ends of the trolley support member 18 and the opposing support members 32 therebetween, thus, allowing the trolley support member 18 to be moved transverse to the opposing support members 32, and to position the trolley to a desired location in a direction transverse to the trolley support member 18.

The end support members 32 and the opposing substantially upright legs 34 of the opposing end supports 28 are fastened one to the other with removable fasteners 46, and the base plates 36 are fastened to the opposing substantially upright legs 34 with removable fasteners 48.

The telescoping extension boom 16 has telescoping extension elements 50, 52, and 54, and the sleeve 20. The telescoping extension element 50 slidably fits into the telescoping extension element 52, which slidably fits into the telescoping extension element 54, and the telescoping extension element 54 slidably fits into the sleeve 20, which is mounted to and supported by the trolley 12.

The telescoping extension boom 16 has opposing end plates 56, which sandwich end 58 of the telescoping extension element 50 therebetween, and are fastened thereto with fasteners 60. The opposing end plates 56 also sandwich sheave 62 therebetween, which is held in place with shaft 64. The telescoping extension elements 50, 52, and 54, and the sleeve 20 have spaced apart opposing holes 65 therethrough and clevis pin 66 removably inserted into a selected one of the opposing holes 65 of the sleeve 20 and the telescoping extension elements 50, 52, and 54 to lock the telescoping extension elements 50, 52, and 54, and the sleeve 20 of the telescoping extension boom 16 one to the other and hold the telescoping extension boom 16 to a desired length.

The hoist 22 has winch 67, which has hoist cable 68 mounted about the drum of the winch 67 and extending over the sheave 62, which is typically rotatable, as in a pulley, to minimize friction of the hoist cable 68 about the sheave 62. The hoist cable 68 has lifting end 69, which is adapted to releasably attach to the weight 26 or other suitable object.

The opposing trolley positioners 24 and 25 are opposingly fastened to the top of the sleeve 20 and have winches 64 and winch cables 70 and 72, respectively, which have eyes 74 and 76, respectively. The trolley support member 18 has opposing hooks 77. The eyes 74 and 76 of the winch cables 70 and 72, respectively, are placed about the opposing hooks 77, and by using one or both of the appropriate opposing trolley positioners 24 and/or 25, the trolley 12 is pulled to a desired location along the trolley support member 18.

The telescoping extension boom 16 and the opposing trolley positioners 24 are used to maneuver the hoist cable 68 in a substantially collinear direction with that of the trolley support member 18. The opposing end mounts 30 are used to move the trolley support member 18 in a direction transverse to the trolley support member 18 along the opposing support members 32, and to position the trolley 12 to a desired location in a direction transverse to the trolley support member 18.

The trolley 12 has a plurality of upper roller bearings 78, a plurality of lower roller bearings 79, opposing plates 82 substantially perpendicular to the axes of the plurality of upper roller bearings 78 and the plurality of lower roller bearings 79, and opposing upper and lower plates 84 and 86, respectively, which are substantially perpendicular to the opposing plates 82. The trolley 12 also has opposing angles 88.

Each of the plurality of upper roller bearings 78 and each of the plurality of lower roller bearings 79 have bearings 90 and bearing shafts 92 having threaded ends 96. The opposing angles 88 are fastened to the upper plate 84 with removable fasteners 100, which sandwich and clamp the sleeve 20 of the telescoping extension boom 16 between the upper and lower plates 84 and 86, respectively. The opposing plates 82 are fastened to the opposing angles 88 with removable fasteners 102 about the threaded ends 96 of the bearing shafts 92. The removable fasteners 102 also fasten and sandwich the bearing shafts 92 of the plurality of upper roller bearings 78 and the plurality of lower roller bearings 79 between and to the opposing plates 82. The trolley 12 also has bushings 106 about the bearing shafts 92 to prevent the ends 108 of each of the plurality of upper roller bearings 78 and each of the plurality of lower roller bearings 79 from rubbing against the opposing plates 82 and the trolley support member 18.

The plurality of upper roller bearings 78 and the plurality of lower roller bearings 79 are, thus, sandwiched between the opposing plates 82 of the trolley 12, and the plurality of upper roller bearings 78 and the plurality of lower roller bearings 79 rollably sandwich an upper portion and a lower portion of the trolley support member 18 therebetween.

The winch 67 of the hoist 22 is fastened to the lower plate 86, and the opposing trolley positioners 24 and 25 are opposingly fastened to the top of the sleeve 20 of the telescoping extension boom 16.

The removable fasteners 44, 46, 100, and 102 and the fasteners 60, any other fasteners or removable fasteners referred to herein are preferably mating bolts and nuts, although other suitable fasteners may be used.

The trolley support member 18 is of I beam construction, although other suitable construction may be used. The end support members 32 and the opposing substantially upright legs 34 of the opposing end supports 28 are of angle construction, although other suitable construction may be used. The telescoping extension elements 50, 52, and 54, and the sleeve 20 of the telescoping extension boom 16 are typically of square tubing construction, although other suitable construction may be used. The portable knockdown trolley hoist 10 is typically of steel construction, although other suitable materials and/or combination of materials or construction may be used.

Figure 5:
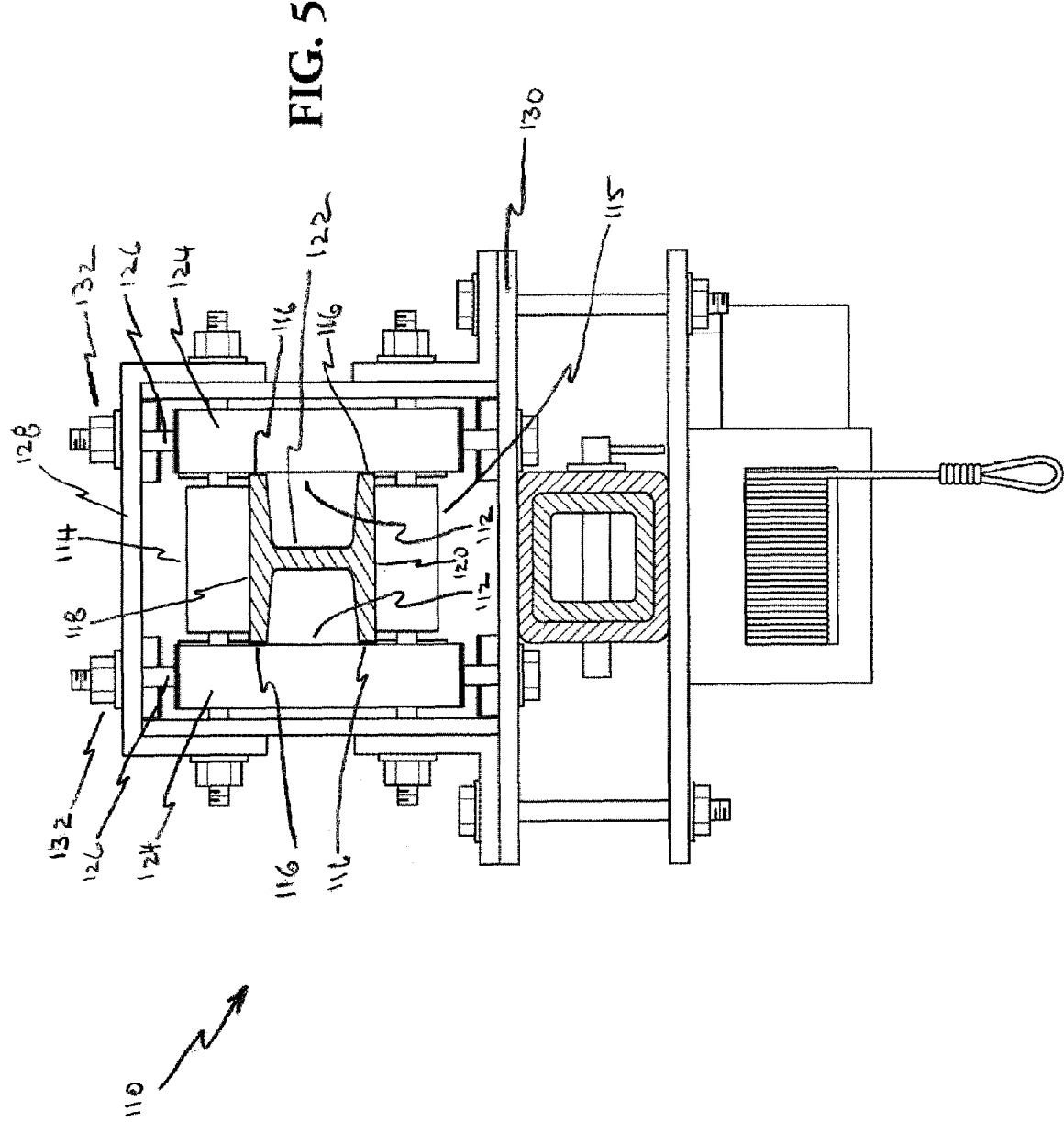
FIG. 5 is a cross section view of an alternate embodiment of a trolley of the portable knockdown trolley hoist of FIG. 1.

FIG. 5 shows an alternate embodiment of a trolley 110 of the portable knockdown trolley hoist 10, which is substantially the same as the trolley 12, except that the trolley 110 has a plurality of opposing side roller bearings 112, which are substantially transverse to a plurality of upper roller bearings 114 and a plurality of lower roller bearings 115, and which allow the trolley 110 to rollably against edges 116, top 118, and bottom 120 of trolley support member 122 and sandwich the trolley support member 122 therebetween.

The plurality of upper roller bearings 114 and the plurality of lower roller bearings 115 of the trolley 110 are substantially the same as the plurality of upper roller bearings 78 and the plurality of lower roller bearings 79, respectively, of the trolley 12.

The opposing side roller bearing 112 of the trolley 110 have bearings 124 and bearing shafts 126, which are held in place by channel 128 and plate 130, with removable fasteners 132.

Figure 6:
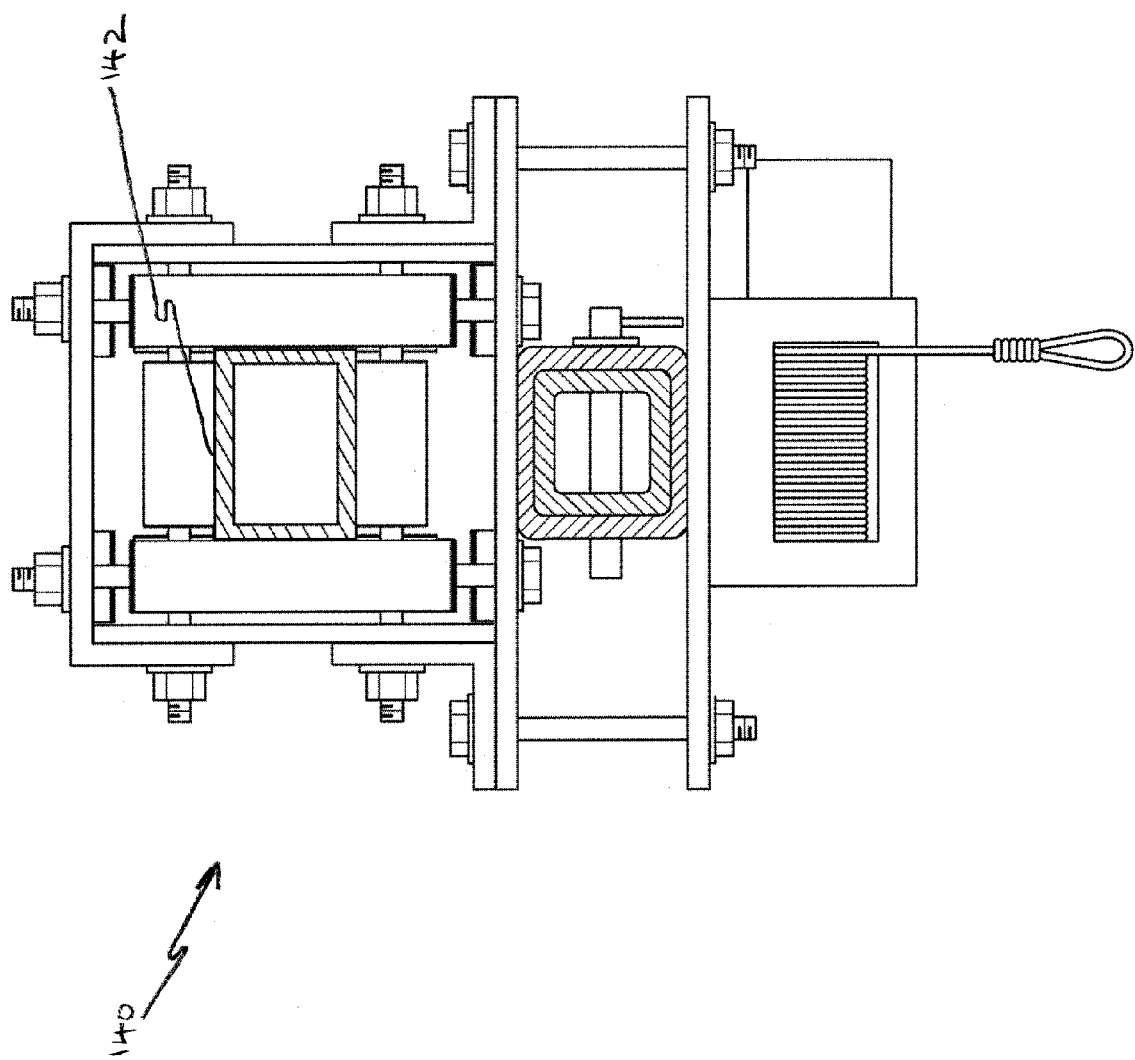
FIG. 6 is a cross section view of the trolley of FIG. 5 and an alternate embodiment of another trolley support member of the portable knockdown trolley hoist of FIG. 1.

FIG. 6 shows an alternate embodiment of a trolley 140 of the portable knockdown trolley hoist 10, which is substantially the same as the trolley 110, and which may be used with an alternate trolley support member 142, which is substantially rectangular, or which may be of other suitable construction.

Figure 7:
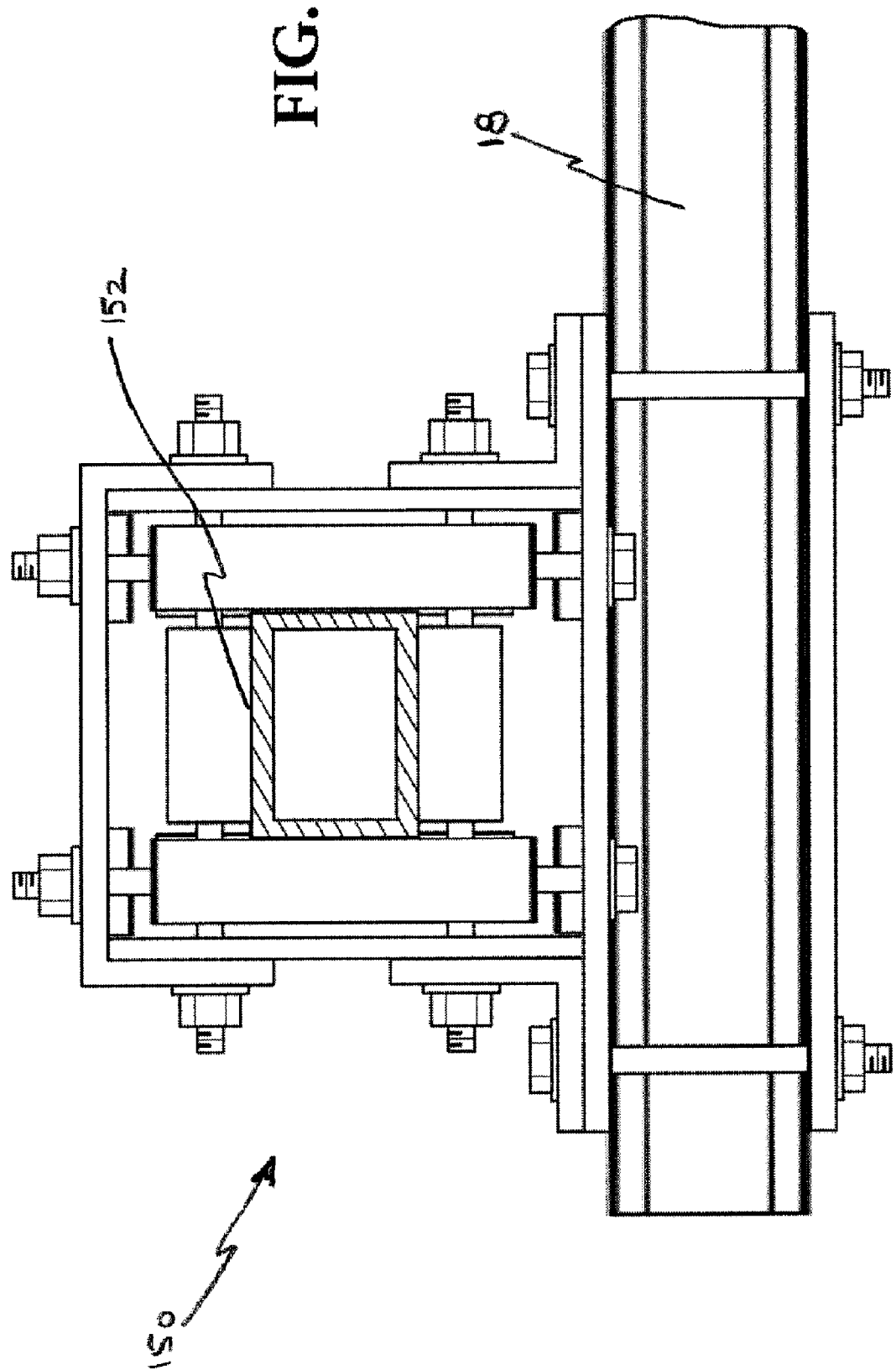
FIG. 7 is a cross section view of an alternate embodiment of an opposing end mount constructed as an opposing end trolley of the portable knockdown trolley hoist of FIG. 1.

FIG. 7 shows an alternate embodiment of an opposing end mount constructed as an opposing end trolley 150 that is rollably mounted to an alternate opposing end support member 152 of the portable knockdown trolley hoist 10. The opposing end trolleys 150 allow the trolley support member 18, also shown in FIG. 7, to be positioned transverse to the axis of the trolley support member 18, or transverse to another trolley support member of other suitable construction, and to be moved in substantially the same direction as the axes of the alternate opposing end support members 152. The opposing end trolleys 150 are of substantially the same construction as the alternate embodiment of the trolley 140 and the alternate embodiment of the trolley 110, each of which have opposing side roller bearings and upper and lower roller bearings.

Figure 8:
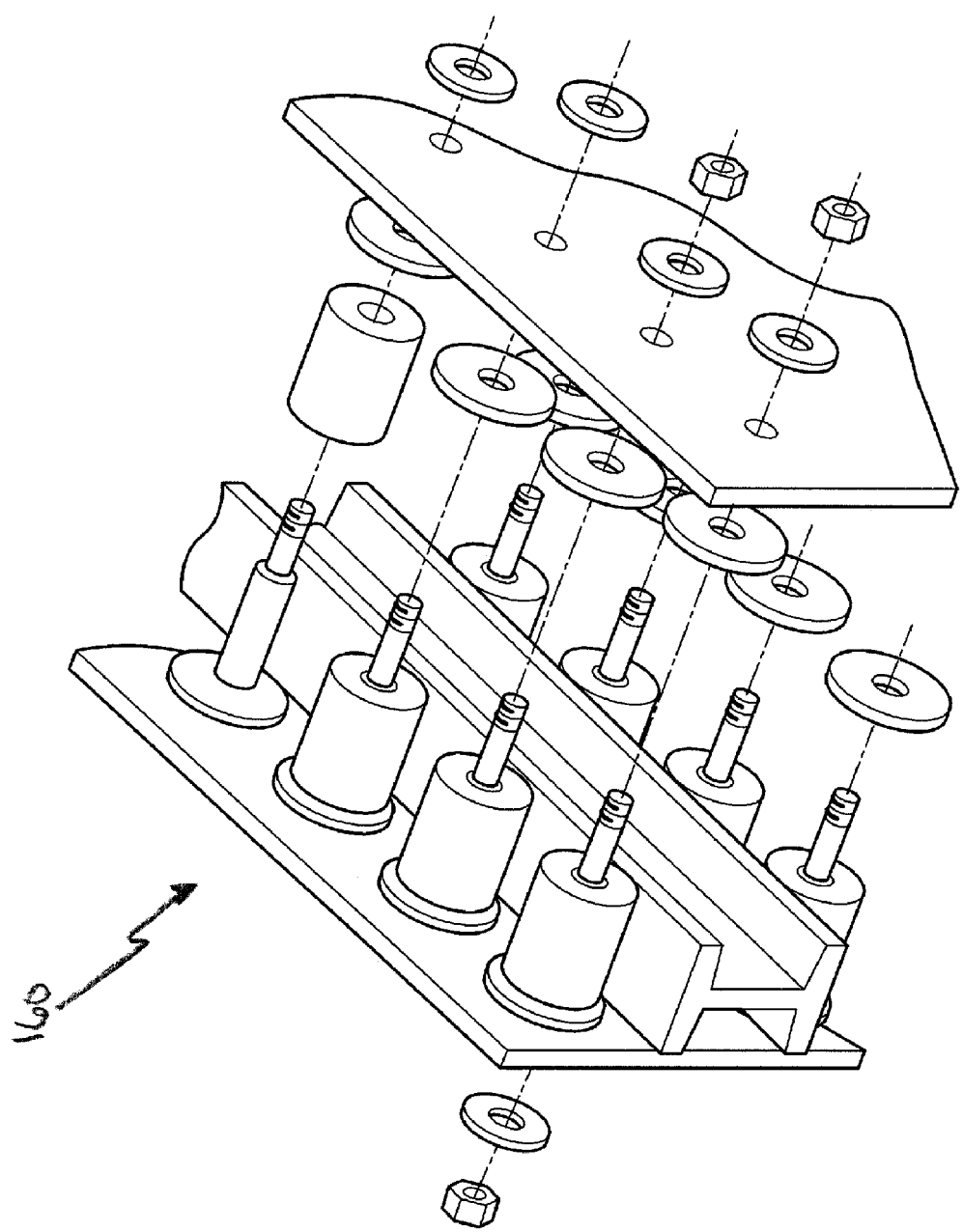
FIG. 8 is a partial exploded view of an alternate embodiment of an opposing end mount constructed as an alternate embodiment of an opposing end trolley of the portable knockdown trolley hoist of FIG. 1.
Figure 9:
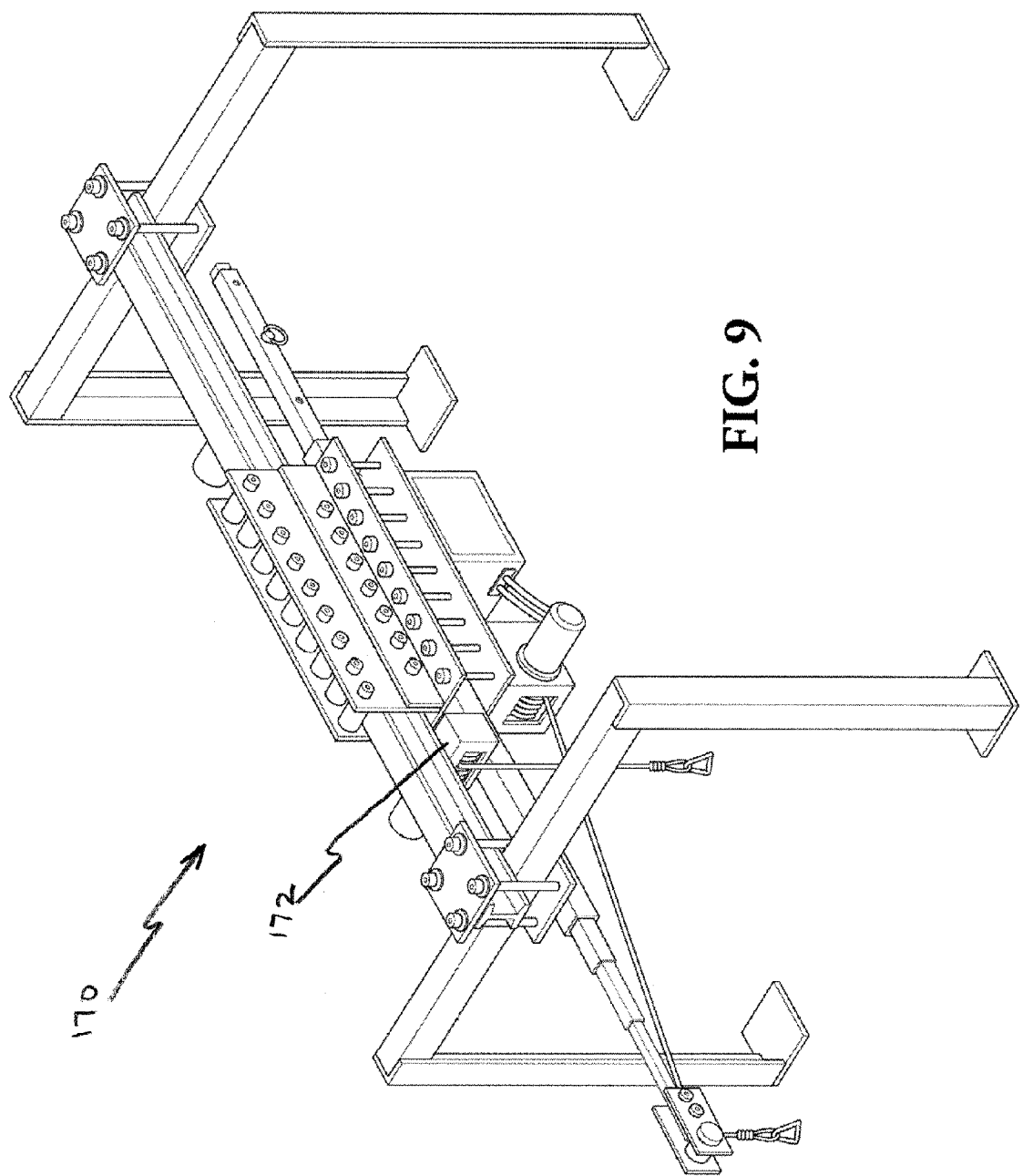
FIG. 9 is a perspective view of an alternate embodiment of a portable knockdown trolley hoist, constructed in accordance with the present invention, showing an extension boom of the portable knockdown trolley hoist of FIG. 9 partially extended.
Figure 10:
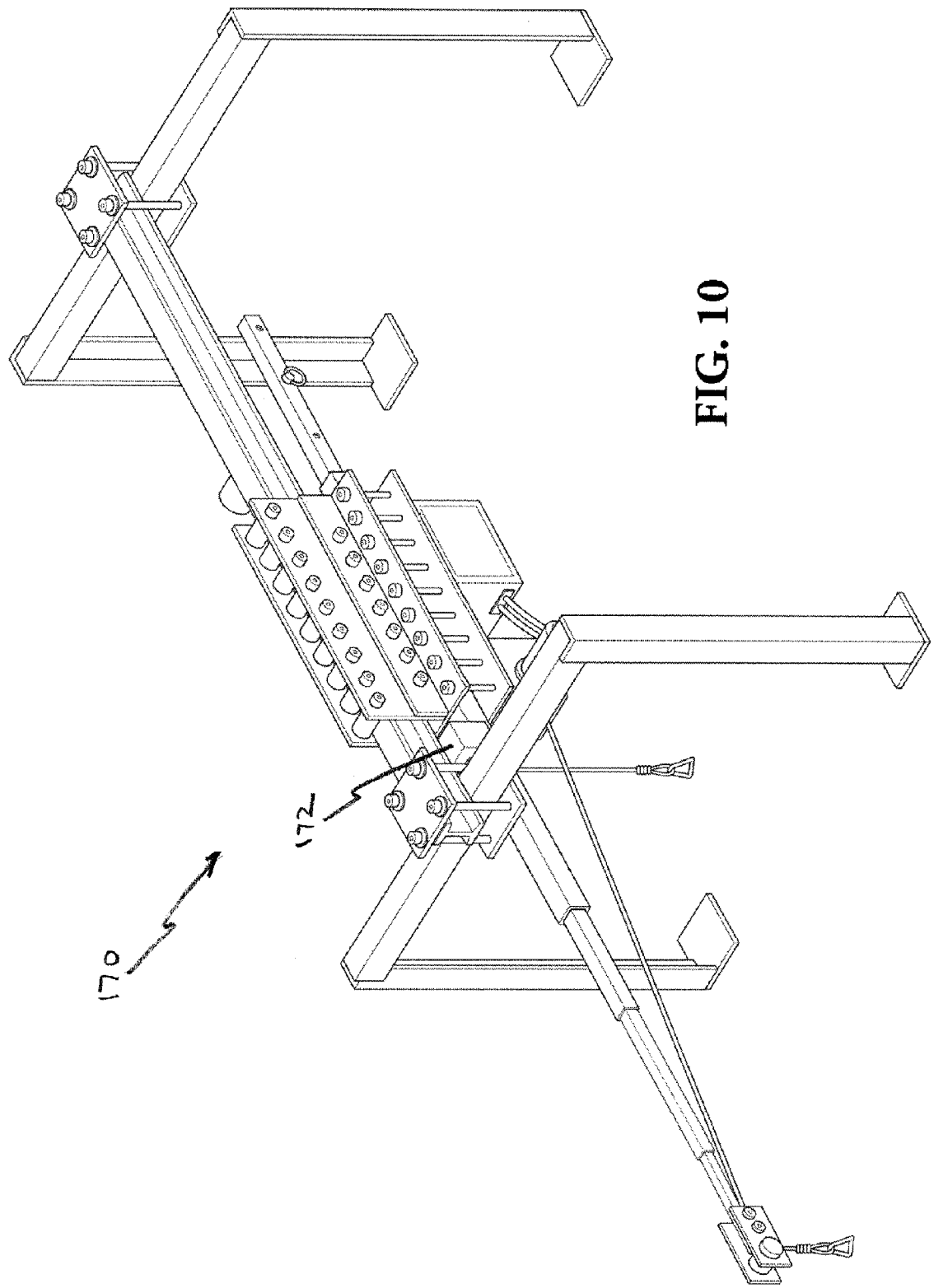
FIG. 10 is a perspective view of the portable knockdown trolley hoist of FIG. 9 showing the extension boom extended.
Figure 11:
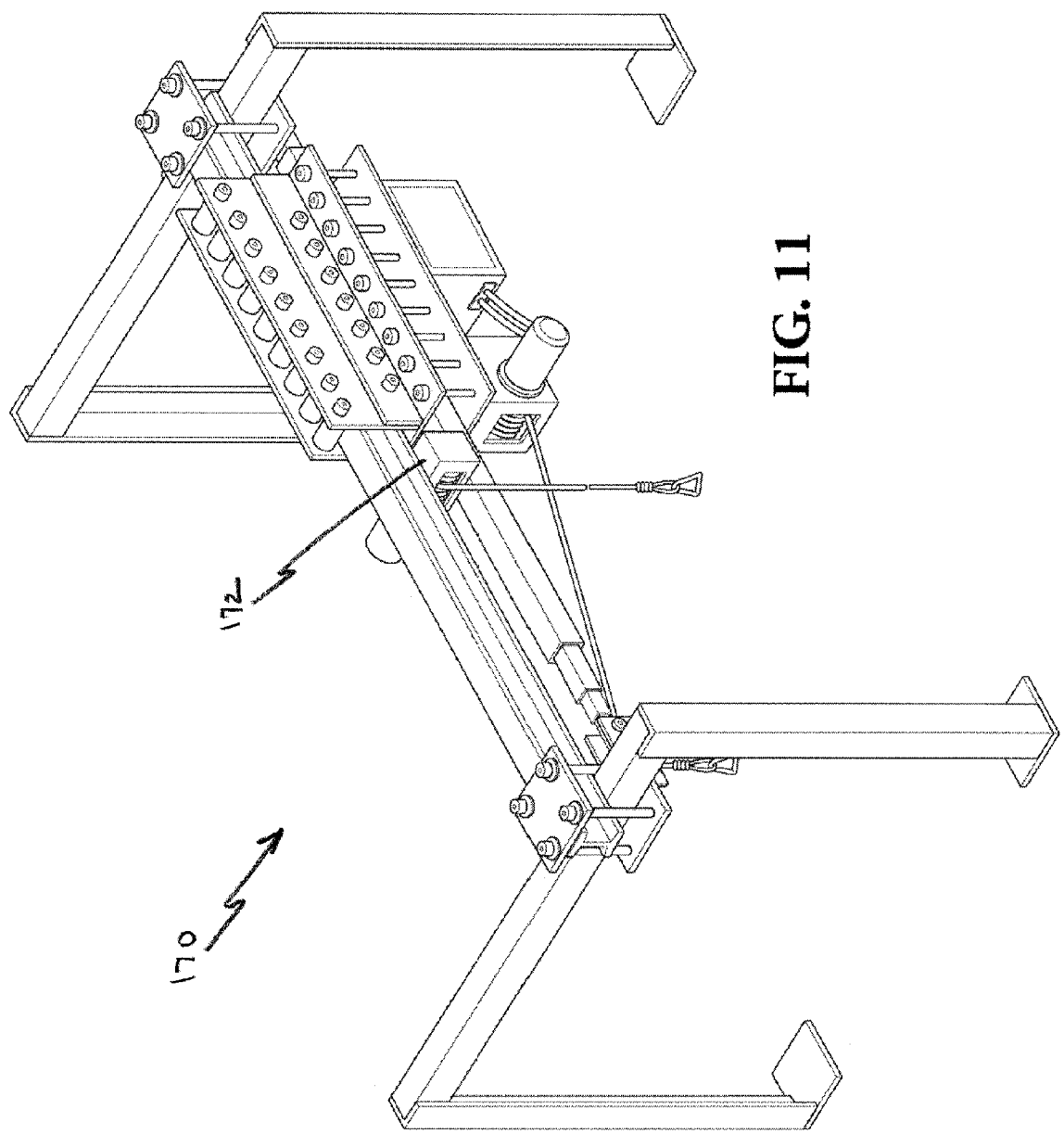
FIG. 11 is a perspective view of the portable knockdown trolley hoist of FIG. 9 showing the extension boom retracted.
Figure 12:
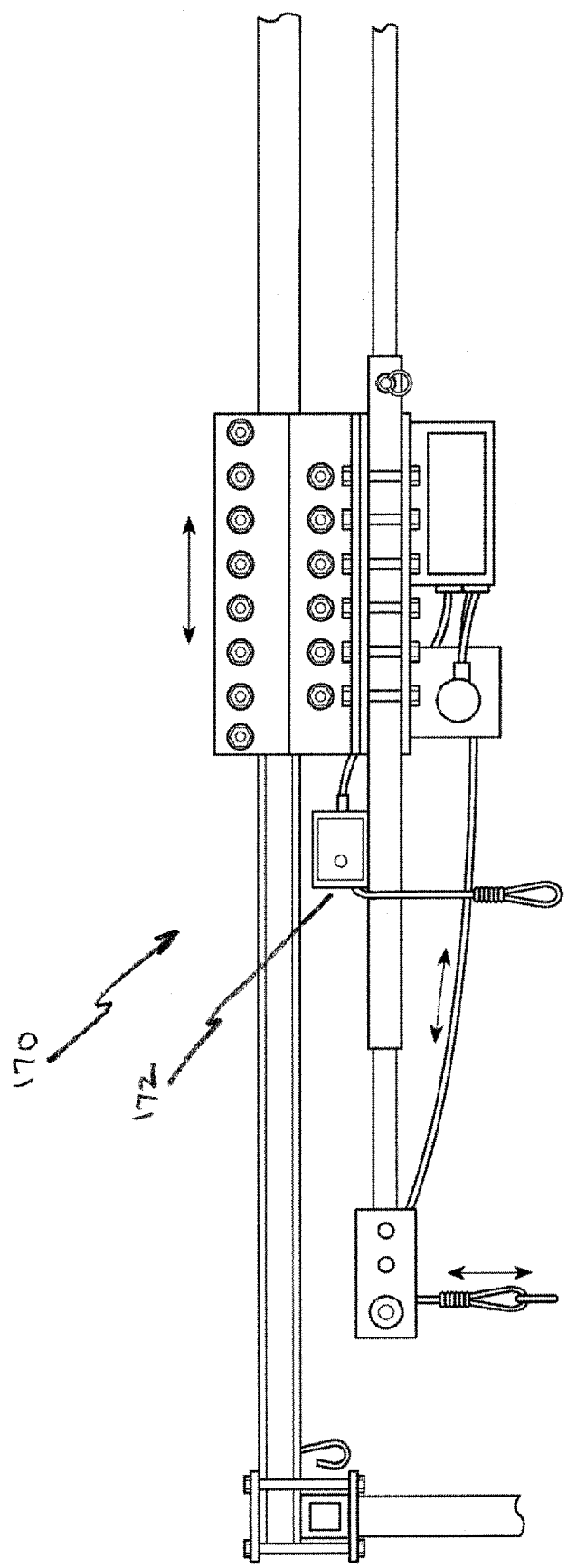
FIG. 12 is a partial side view of the portable knockdown trolley hoist of FIG. 9, showing the extension boom retracted.
Figure 13:
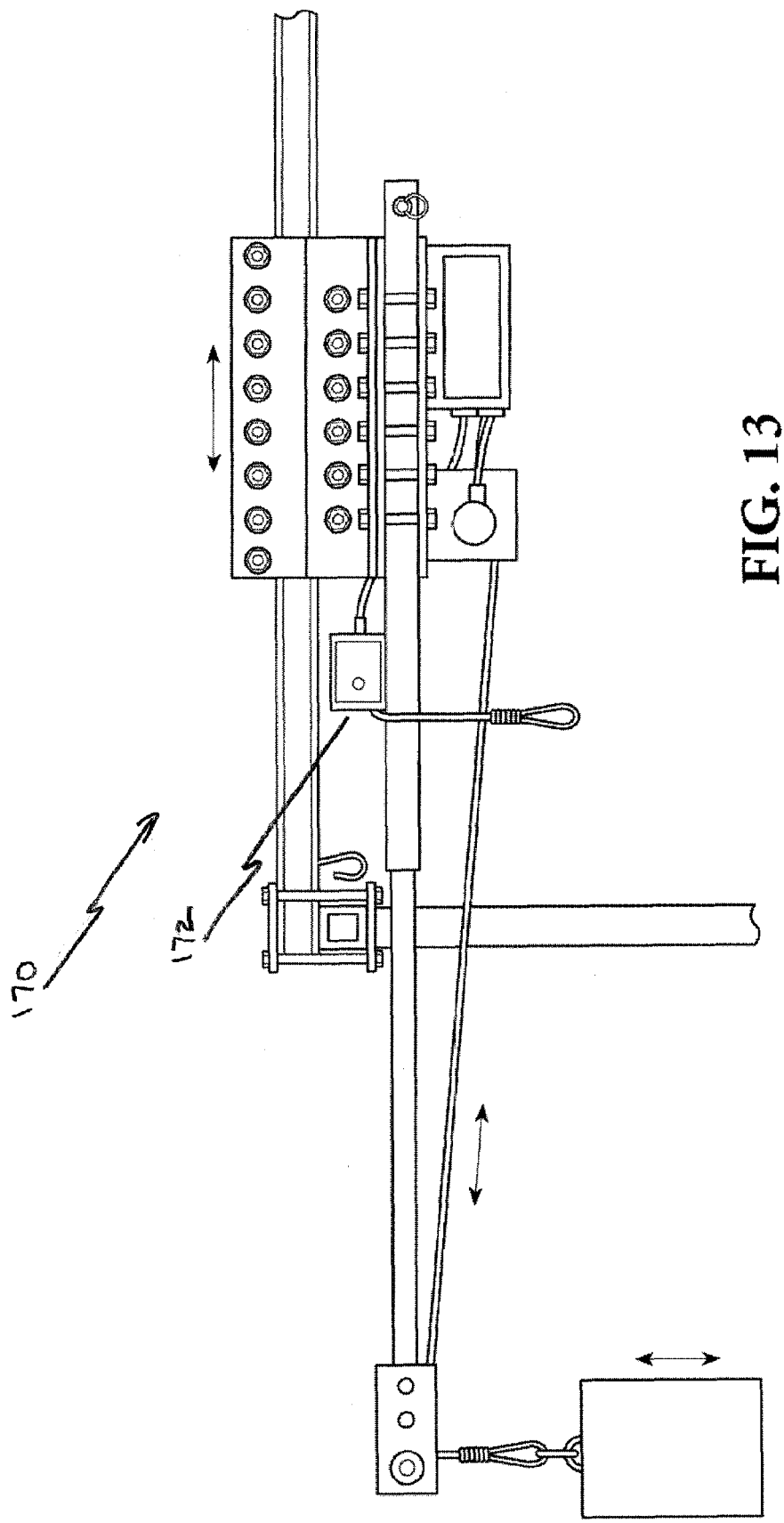
FIG. 13 is a partial side view of the portable knockdown trolley hoist of FIG. 9, showing the extension partially extended and lifting a weight.
Figure 14:
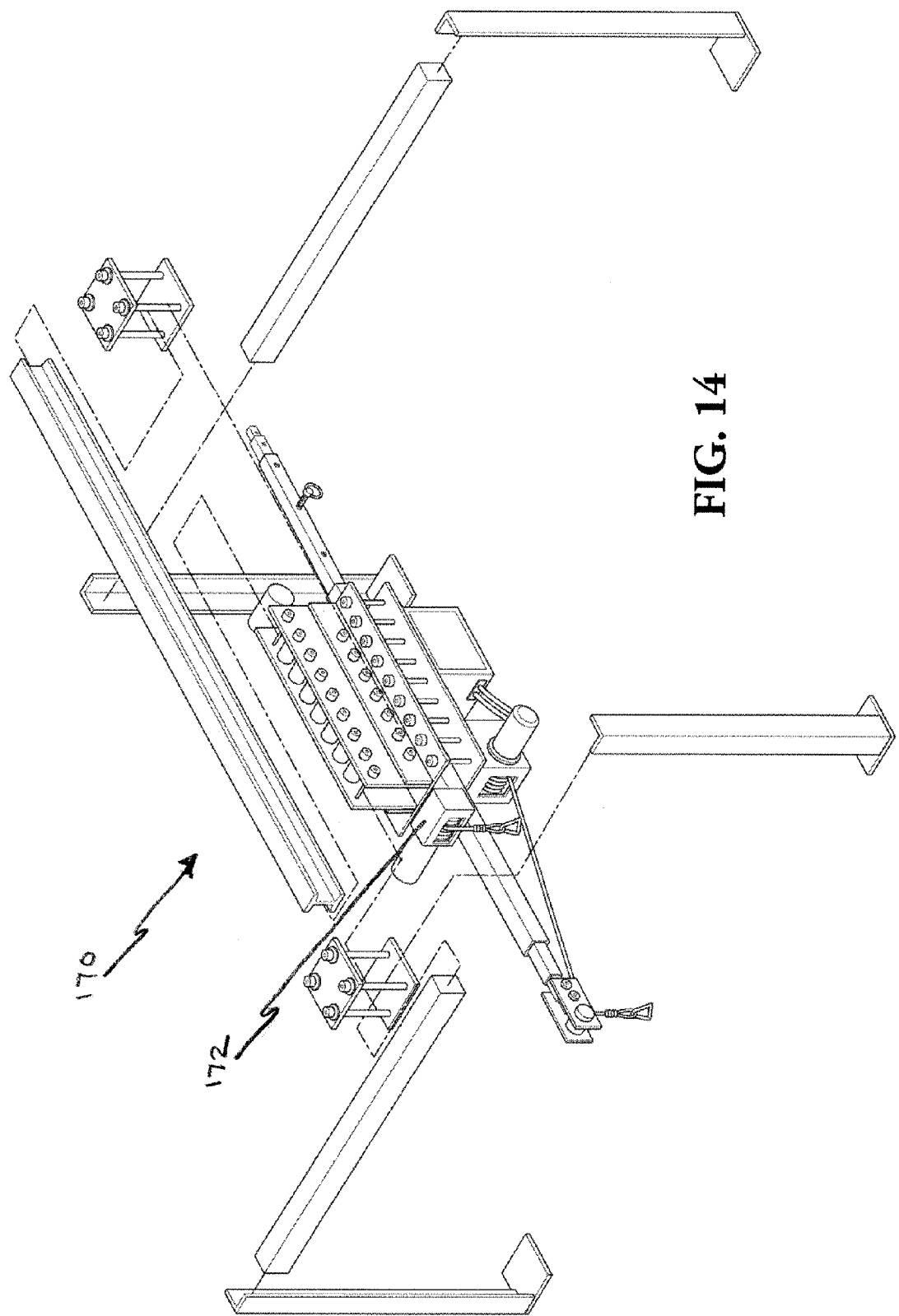
FIG. 14 is an exploded view of the portable knockdown trolley hoist of FIG. 9.
Figure 15:
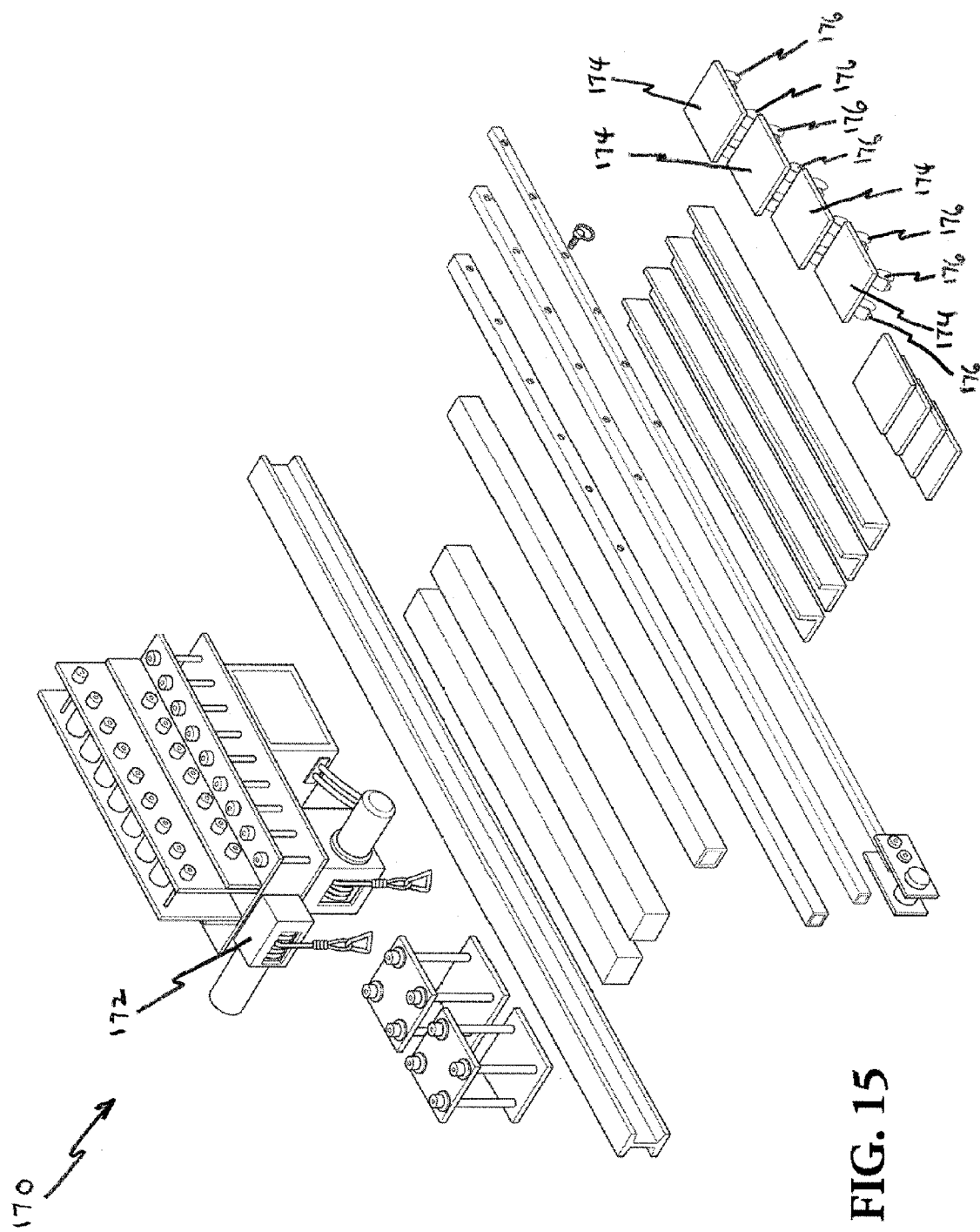
FIG. 15 is a knockdown view of the portable knockdown trolley hoist of FIG. 9.

FIG. 8 shows an exploded view of an alternate embodiment of an opposing end mount constructed as an alternate embodiment of an opposing end trolley 160 having only upper and lower roller bearings. The opposing end trolleys 160 are of substantially the same construction as the trolley 12.

FIGS. 9-15 show an alternate embodiment of a portable knockdown trolley hoist 170, which is substantially the same as the portable knockdown trolley hoist 10, except that the portable knockdown trolley hoist 170 has a single trolley positioner 172, whereas the portable knockdown trolley hoist 10 has opposing trolley positioners 24 and 25. The portable knockdown trolley hoist 170 also has optional base plates 174 having wheels 176.

Figure 16:
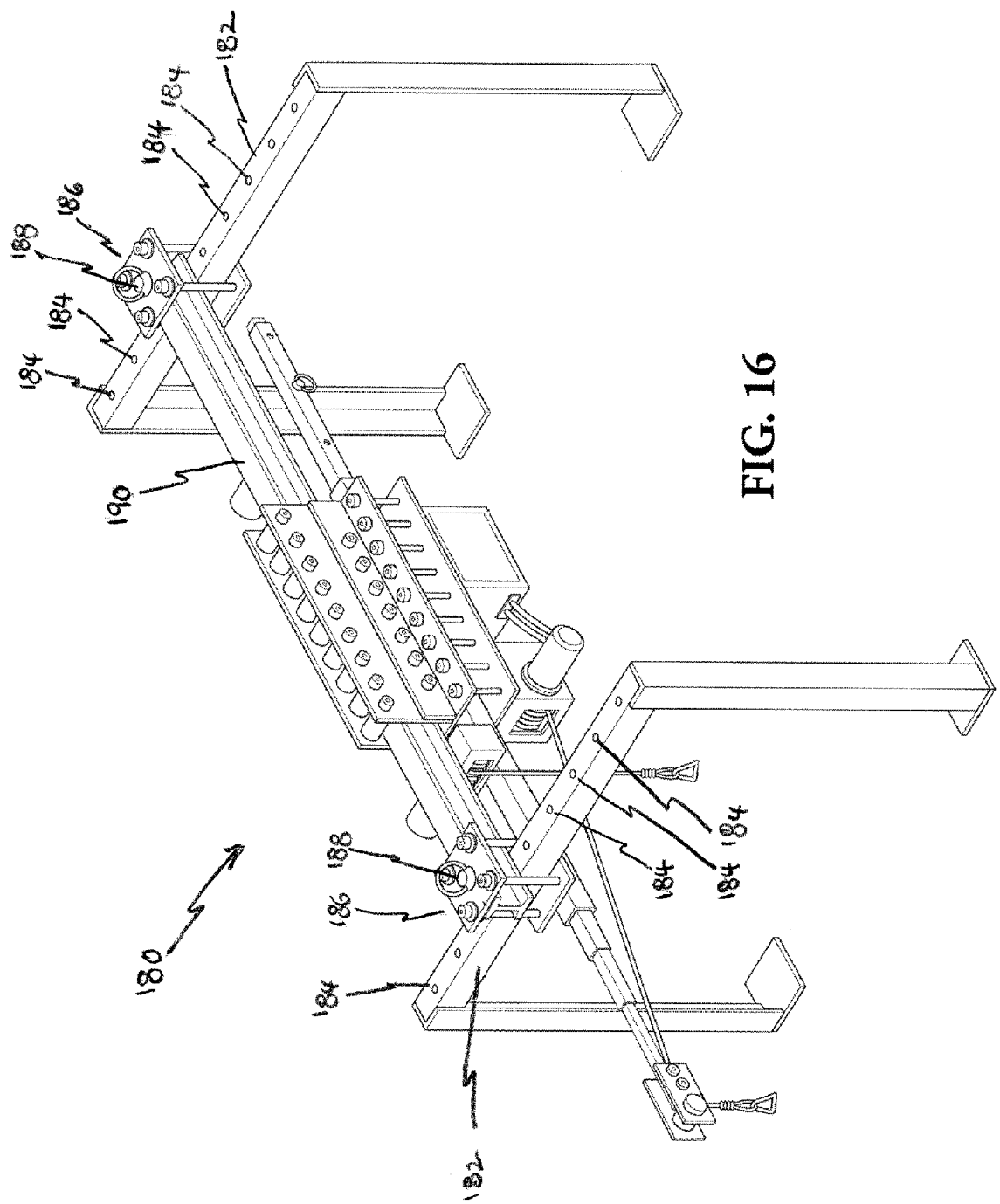
FIG. 16 is a perspective view of an alternate embodiment of a portable knockdown trolley hoist, constructed in accordance with the present invention.

FIG. 16 shows an alternate embodiment of a portable knockdown trolley hoist 180, which is substantially the same as the portable knockdown trolley hoist 170, except that the portable knockdown trolley hoist 180 has opposing substantially rectangular opposing support members 182 having opposing spaced apart holes 184 therein and opposing end mounts 186 having clevis pins 188 removably inserted into selected ones of the opposing spaced apart holes 184 of the opposing support members 182 to lock trolley support member 190 into place at a desired location.

Figure 17:
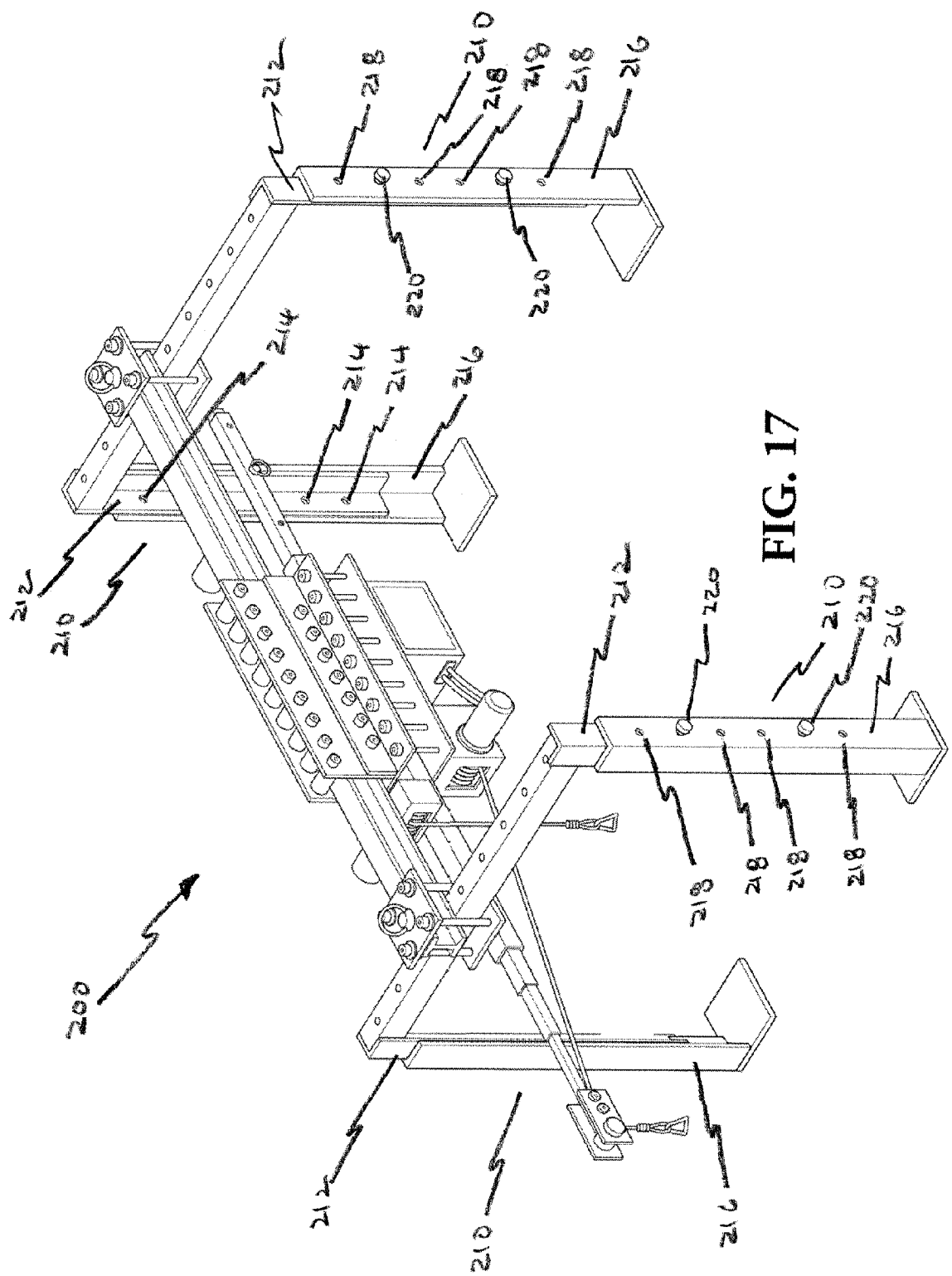
FIG. 17 is a perspective view of an alternate embodiment of a portable knockdown trolley hoist, constructed in accordance with the present invention.

FIG. 17 shows an alternate embodiment of a portable knockdown trolley hoist 200, which is substantially the same as the portable knockdown trolley hoist 180, except that the portable knockdown trolley hoist 200 has adjustable opposing substantially upright legs 210, which have upper leg sections 212, having spaced apart holes 214 therethrough, and lower leg sections 216, having space apart holes 218 therethrough. Removable fasteners 220 are inserted through selected ones of the spaced apart holes 214 and the spaced apart holes 218 to lock the upper leg sections 212 and the lower leg sections 216 one to the other and adjust the portable knockdown trolley hoist 200 to a selected height. The removable fasteners 220 are preferably mating bolts and nuts, although other suitable fasteners may be used.

Figure 18:
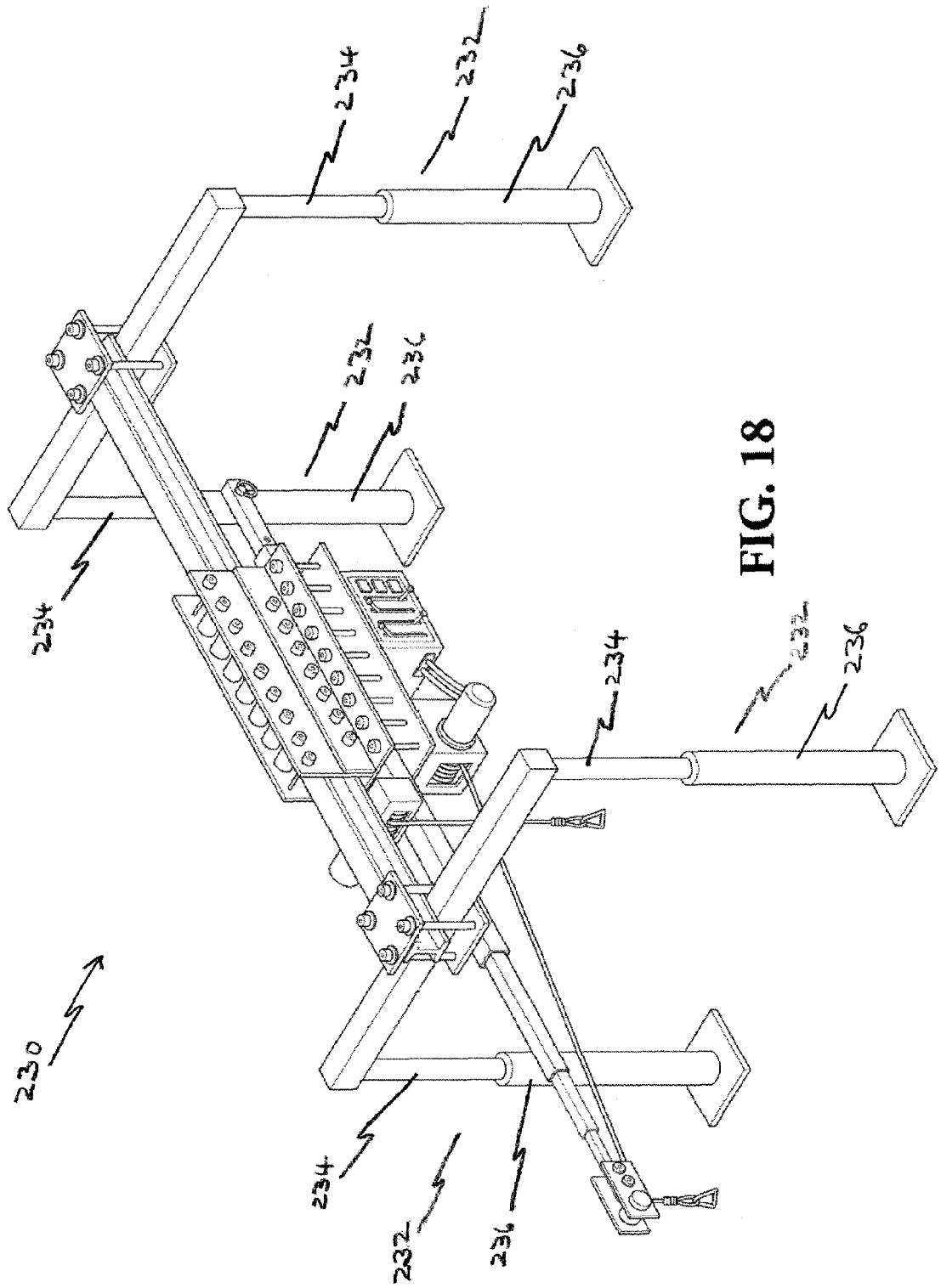
FIG. 18 is a perspective view of an alternate embodiment of a portable knockdown trolley hoist, constructed in accordance with the present invention.
Figure 19:
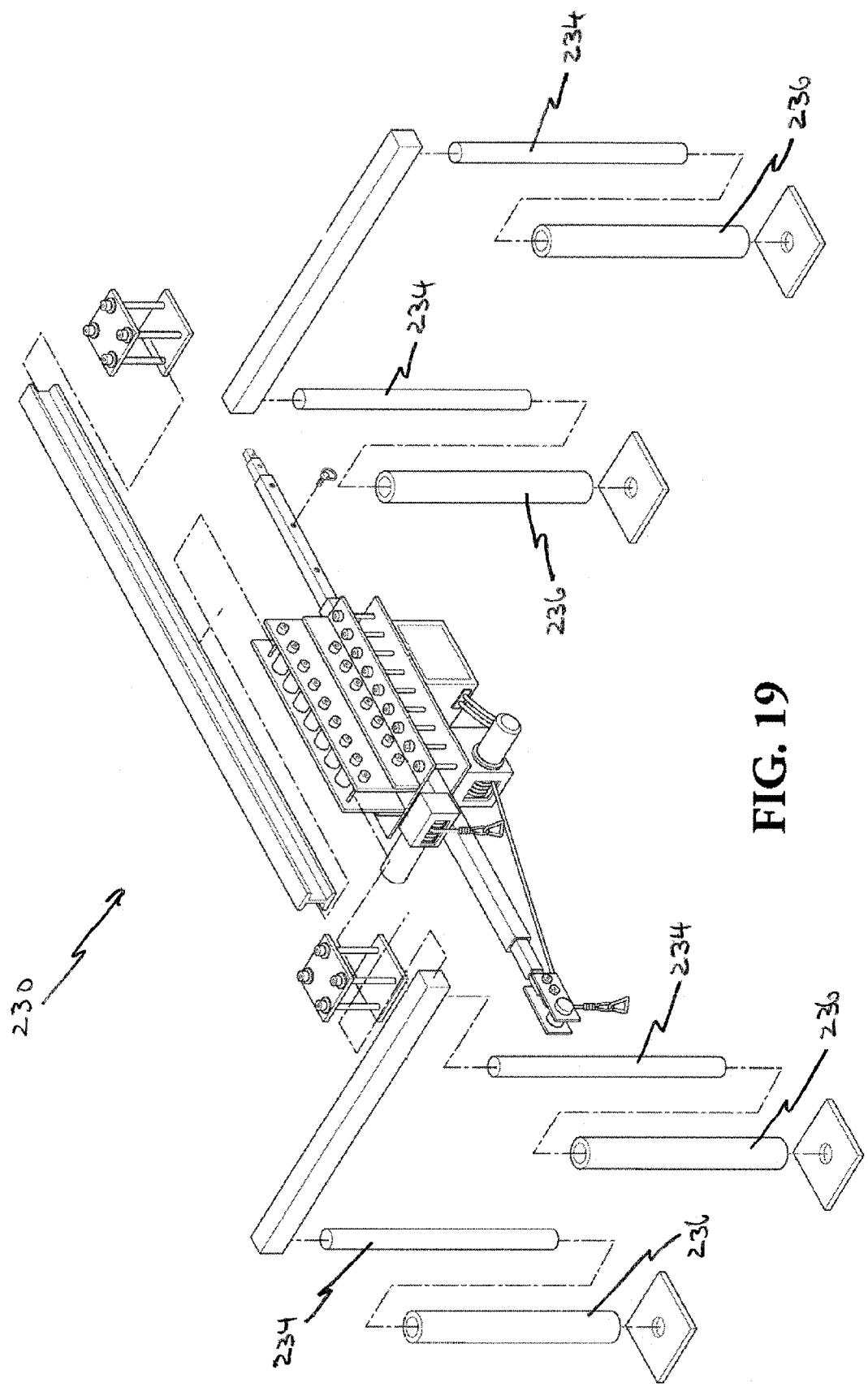
FIG. 19 is an exploded view of the portable knockdown trolley hoist of FIG. 18.
Figure 20:
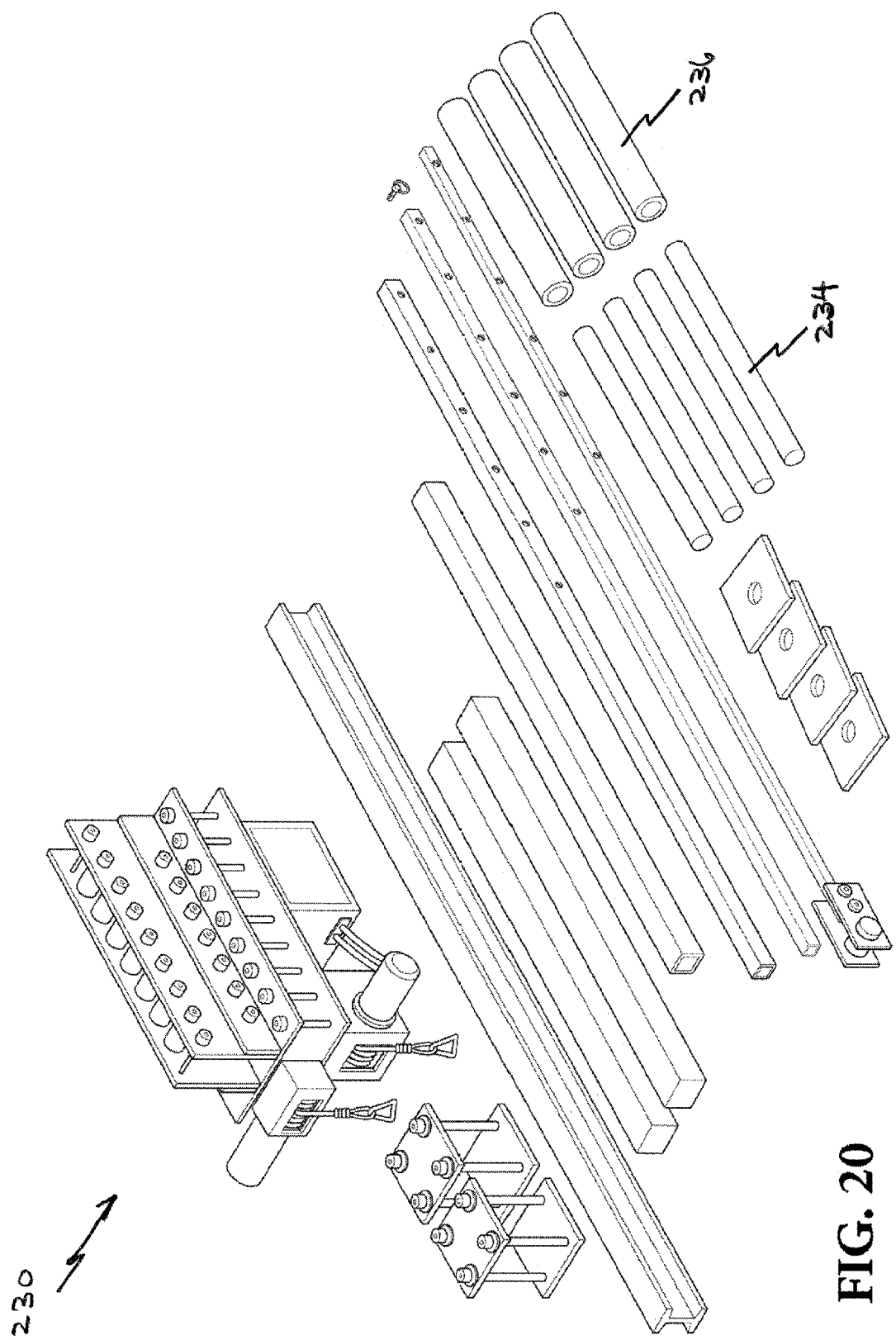
FIG. 20 is a knockdown view of the portable knockdown trolley hoist of FIG. 18.

FIGS. 18-20 show an alternate embodiment of a portable knockdown trolley hoist 230, which is substantially the same as the portable knockdown trolley hoist 170, except that the portable knockdown trolley hoist 230 has telescoping opposing substantially upright legs 232 for raising and/or lowering the portable knockdown trolley hoist 230 to a desired height. The telescoping opposing substantially upright legs 232 have upper leg sections 234 and lower leg sections 236, which may be hydraulically controlled, such as in a hydraulically controlled jack, or the telescoping opposing substantially upright legs 232 may have screw drives, such as in a jack having a screw drive, or other suitable construction may be used.

FIGS. 21-29 show the portable knockdown trolley hoist 170 in combination with different vehicles, an aircraft, and a ship.

Figure 21:
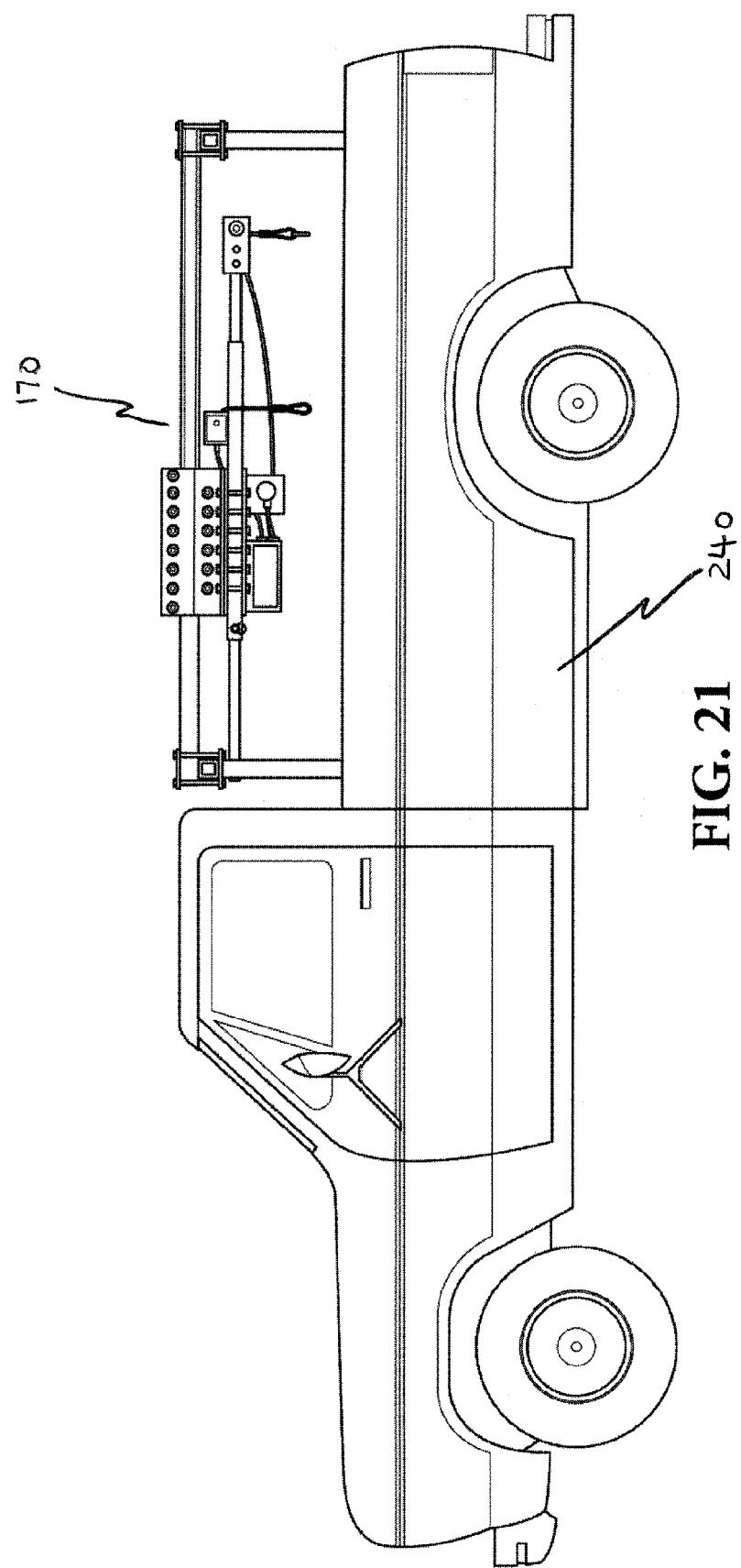
FIG. 21 is a side view of the portable knockdown trolley hoist of FIG. 9 in combination with a pickup truck.

FIG. 21 shows the portable knockdown trolley hoist 170 in combination with a pickup truck 240.

Figure 22:
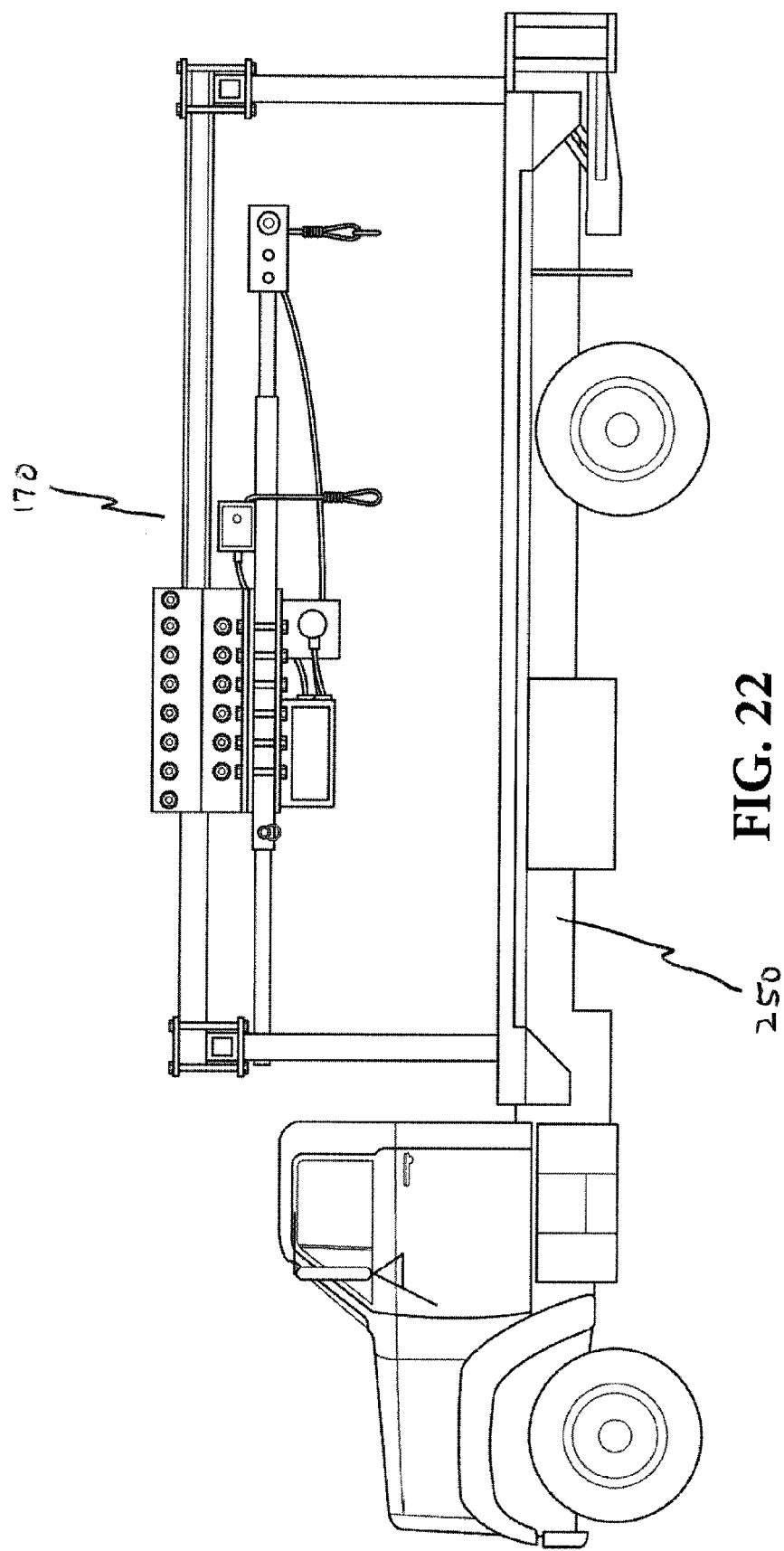
FIG. 22 is a side view of the portable knockdown trolley hoist of FIG. 9 in combination with a flatbed truck.

FIG. 22 shows the portable knockdown trolley hoist 170 in combination with a flatbed truck 250.

Figure 23:
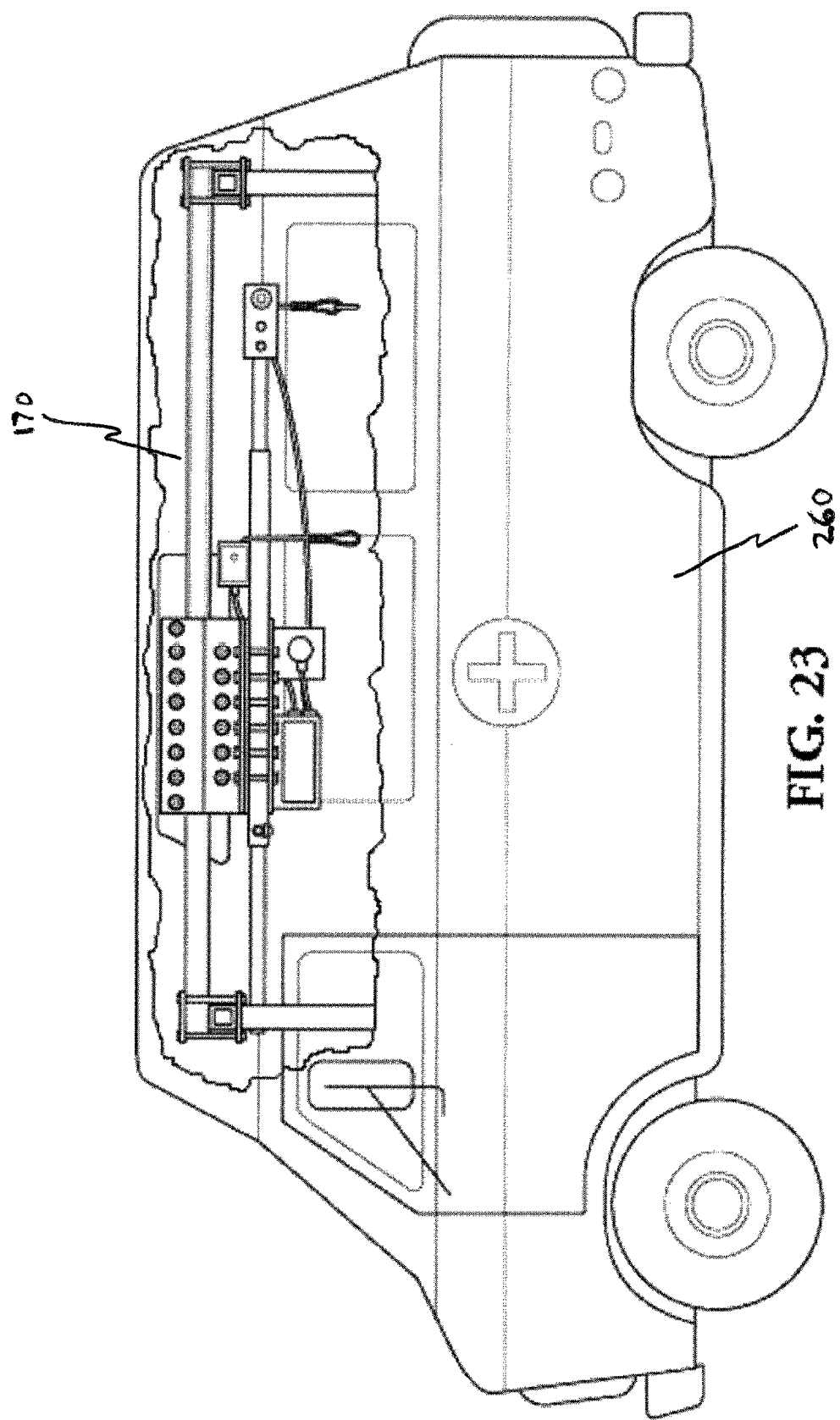
FIG. 23 is a side cutaway view of the portable knockdown trolley hoist of FIG. 9 in combination with and interior to an ambulance.

FIG. 23 shows the portable knockdown trolley hoist 170 in combination with and interior to an ambulance 260.

Figure 24:
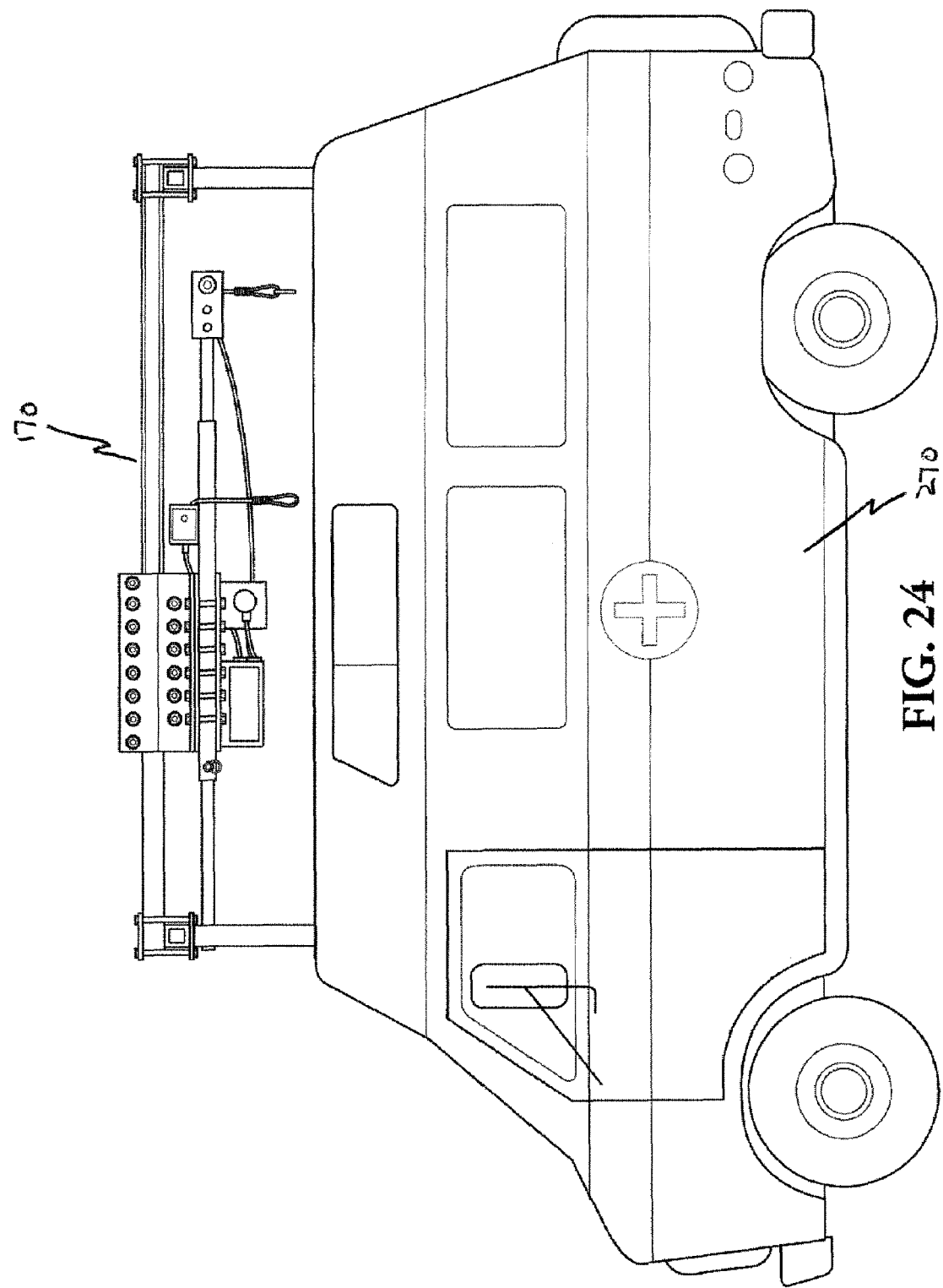
FIG. 24 is a side view of the portable knockdown trolley hoist of FIG. 9 in another combination with and exterior to the ambulance of FIG. 23.

FIG. 24 shows the portable knockdown trolley hoist 170 in combination with and exterior to an ambulance 270.

Figure 25:
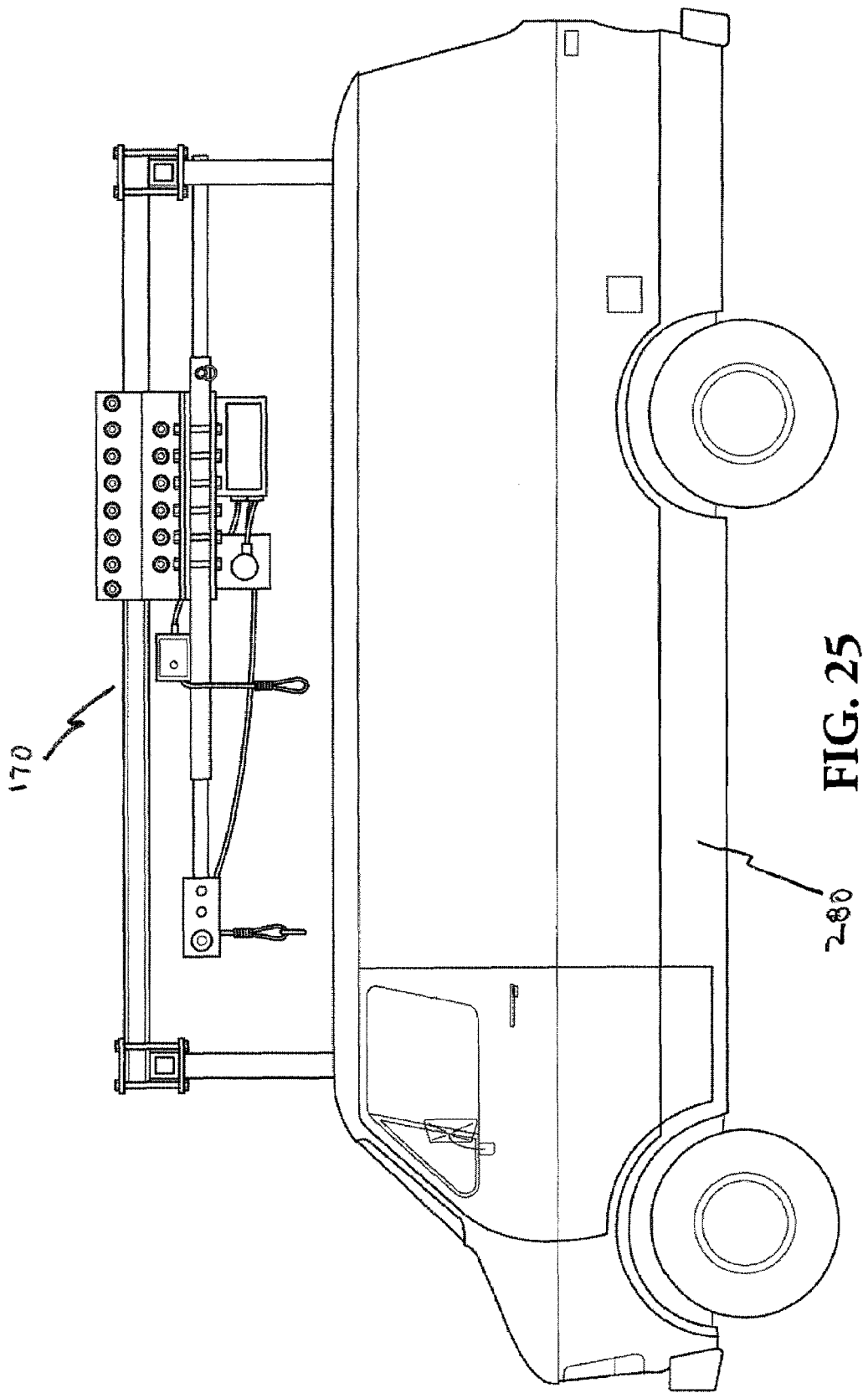
FIG. 25 is a side view of the portable knockdown trolley hoist of FIG. 9 in combination with and exterior to a van.

FIG. 25 shows the portable knockdown trolley hoist 170 in combination with and exterior to a van 280.

Figure 26:
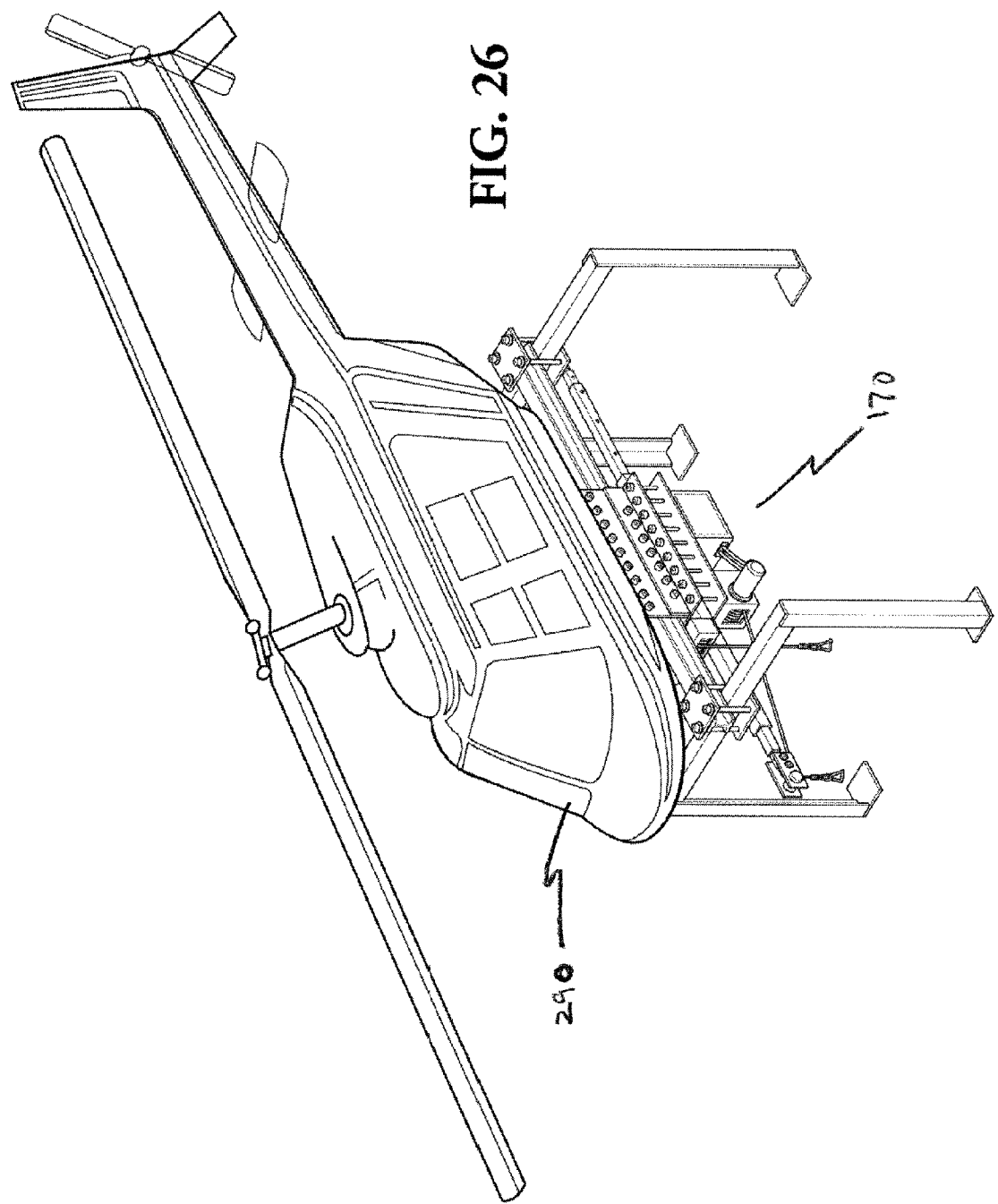
FIG. 26 is a perspective view of the portable knockdown trolley hoist of FIG. 9 in combination with a helicopter.

FIG. 26 shows the portable knockdown trolley hoist 170 in combination with a helicopter 290.

Figure 27:
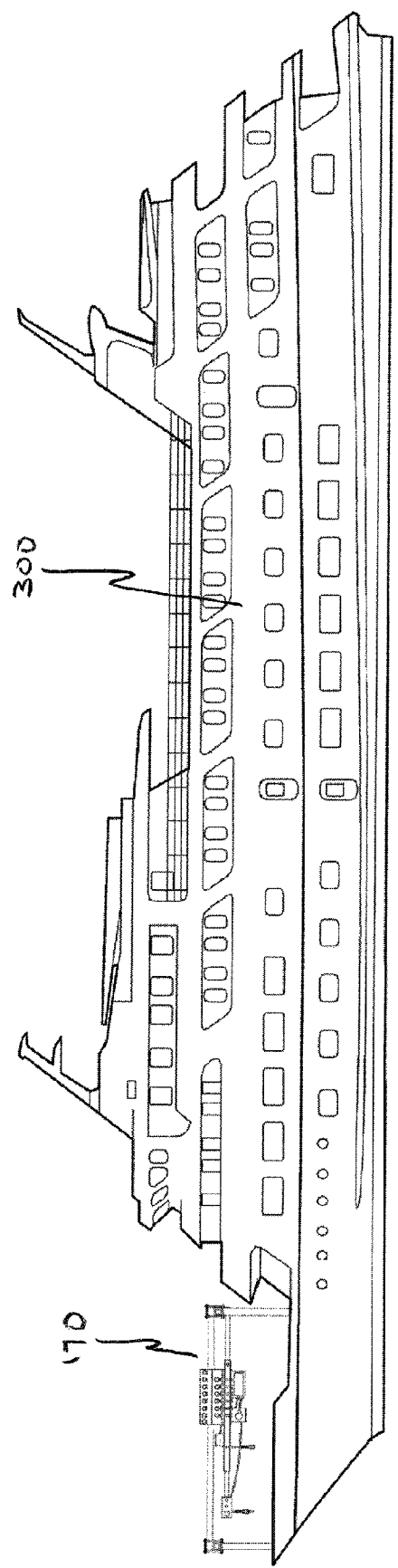
FIG. 27 is a perspective view of the portable knockdown trolley hoist of FIG. 9 in combination with a ship.

FIG. 27 shows the portable knockdown trolley hoist 170 in combination with a ship 300.

Figure 28:
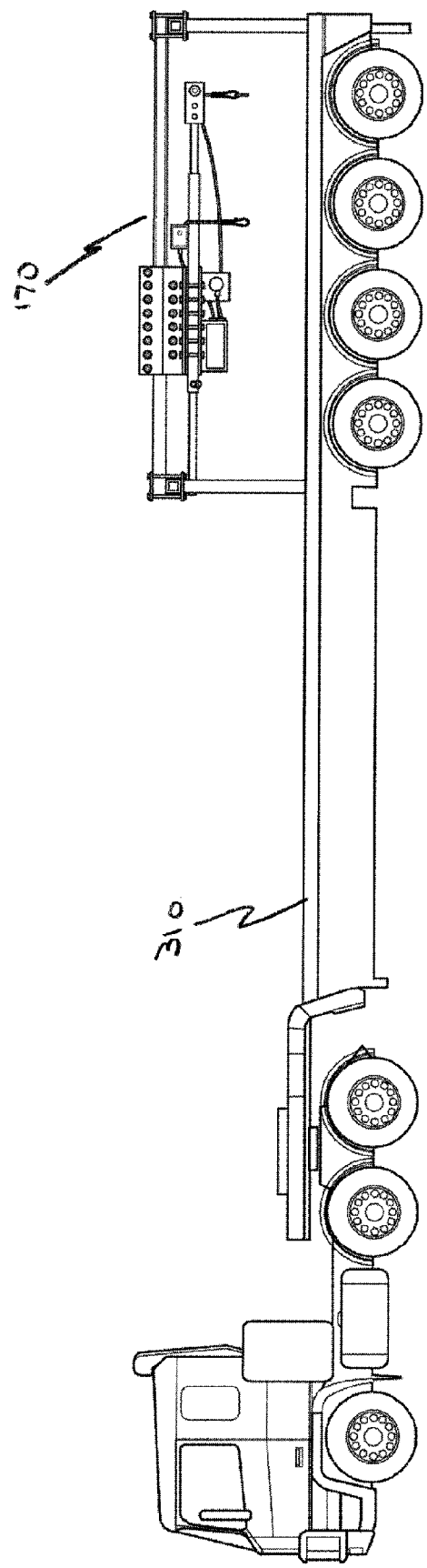
FIG. 28 is a perspective view of the portable knockdown trolley hoist of FIG. 9 in combination with a tractor trailer truck.

FIG. 28 shows the portable knockdown trolley hoist 170 in combination with a tractor trailer truck 310.

Figure 29:
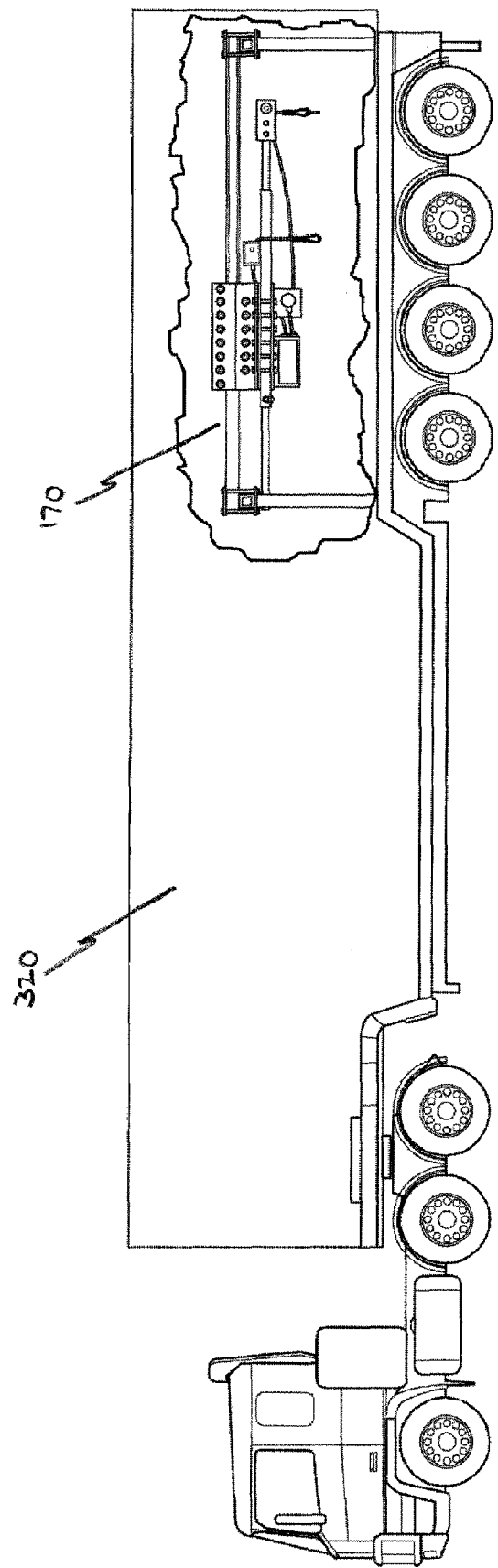
FIG. 29 is a side cutaway view of the portable knockdown trolley hoist of FIG. 9 in combination with and interior to an alternate tractor trailer truck.

FIG. 29 shows the portable knockdown trolley hoist 170 in combination with and interior to an alternate tractor trailer truck 320.

Although the present invention has been described in considerable detail with reference to certain preferred versions thereof, other versions are possible. Therefore, the spirit and scope of the appended claims should not be limited to the description of the preferred versions contained herein.

What is claimed is:

1. A portable knockdown trolley hoist, comprising:
   an overhead trolley support member having a top portion and a bottom portion opposing one another;
   a trolley having a plurality of upper roller bearings, a plurality of lower roller bearings, opposing first mounting plates, an extension boom, and a hoist, said plurality of upper roller bearings and said plurality of lower roller bearings opposing one another, each having shafts transversely mounted to said opposing first mounting plates,
   said plurality of upper roller bearings above and adjacent said top portion of said overhead trolley support member,
   said plurality of lower roller bearings below and adjacent said lower portion of said overhead trolley support member,
said extension boom having a sheave mounted thereto,
said hoist having a winch and a hoist cable,
   said hoist cable extending from said winch and about said sheave and having a lifting end;
opposing raised support members;
opposing raised mounts,
   each said opposing raised mount having opposing second mounting plates removably fastened one to other and sandwiching said overhead trolley support member therebetween,
   said trolley rollably mounted to said overhead trolley support member between said opposing raised mounts;
opposing substantially upright legs,
   each said opposing raised support member having at least two of said opposing substantially upright legs removably fastened thereto.

2. The portable knockdown trolley hoist according to claim 1, wherein:
said plurality of upper roller bearings and said plurality of lower roller bearings rollably sandwich said overhead trolley support member therebetween.

3. The portable knockdown trolley hoist according to claim 1, wherein:
said overhead trolley support member has opposing ends;
said opposing raised mounts sandwich said overhead trolley support member therebetween adjacent said opposing ends.

4. The portable knockdown trolley hoist according to claim 1, wherein:
said plurality of upper roller bearings are spaced apart and said plurality of lower roller bearings are spaced apart.

5. The portable knockdown trolley hoist according to claim 1, wherein:
said plurality of upper roller bearings are substantially equally spaced apart and
said plurality of lower roller bearings are substantially equally spaced apart.

6. The portable knockdown trolley hoist according to claim 1, wherein:
said plurality of upper roller bearings and said plurality of lower roller bearings are spaced apart along a length of said opposing first mounting plates.

7. The portable knockdown trolley hoist according to claim 1, wherein:
said extension boom comprises a telescoping extension boom.

8. The portable knockdown trolley hoist according to claim 1, wherein said overhead trolley support member has opposing ends:
said extension boom extends beyond at lest one of said opposing ends.

9. The portable knockdown trolley hoist according to claim 1, wherein:
said extension boom extends beyond at least one of said opposing raised support members.

10. The portable knockdown trolley hoist according to claim 1, wherein:
said extension boom is below said overhead trolley support member.

11. The portable knockdown trolley hoist according to claim 1, wherein said trolley has opposing side roller bearings and said trolley support member has opposing sides transverse to said top portion and said bottom portion of said trolley support member:
said opposing side roller bearings adjacent said opposing sides of said trolley support member.

12. The portable knockdown trolley hoist according to claim 1, wherein said trolley has opposing side roller bearings and said trolley support member has opposing sides transverse to said top portion and said bottom portion of said trolley support member:
said opposing side roller bearings rollably sandwiching said opposing sides of said trolley support member therebetween.

13. The portable knockdown trolley hoist according to claim 1, wherein:
said overhead trolley support member is substantially rectangular shaped.

14. The portable knockdown trolley hoist according to claim 1, wherein:
said overhead trolley support member is substantially I beam shaped.

15. The portable knockdown trolley hoist according to claim 1, wherein:
said shafts of said plurality of upper roller bearings and said plurality of lower roller bearings are removably mounted to said opposing first mounting plates.

* * * * *